United States Patent
Wakabayashi et al.

(10) Patent No.: US 9,531,026 B2
(45) Date of Patent: Dec. 27, 2016

(54) PROCESS FOR PRODUCING FLUORINATED ION EXCHANGE RESIN FLUID

(71) Applicant: Asahi Glass Company, Limited, Chiyoda-ku (JP)

(72) Inventors: Hirokazu Wakabayashi, Kanagawa (JP); Satoru Hommura, Kanagawa (JP); Takashi Saeki, Kanagawa (JP); Tetsuji Shimohira, Kanagawa (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 575 days.

(21) Appl. No.: 13/753,705

(22) Filed: Jan. 30, 2013

(65) Prior Publication Data

US 2013/0209900 A1   Aug. 15, 2013

Related U.S. Application Data

(60) Provisional application No. 61/622,180, filed on Apr. 10, 2012.

(30) Foreign Application Priority Data

Jan. 31, 2012   (JP) ................. 2012-019005

(51) Int. Cl.
*H01M 8/1018* (2016.01)
*H01M 8/10* (2016.01)
*H01M 4/86* (2006.01)

(52) U.S. Cl.
CPC ......... *H01M 8/1018* (2013.01); *H01M 8/1023* (2013.01); *H01M 8/1039* (2013.01);
(Continued)

(58) Field of Classification Search
USPC ............................................ 429/408; 521/25
See application file for complete search history.

(56) References Cited

U.S. PATENT DOCUMENTS

| | | | |
|---|---|---|---|
| 2006/0063903 A1* | 3/2006 | Kasahara et al. | 526/247 |
| 2006/0099476 A1* | 5/2006 | Watakabe | B01D 71/82 |
| | | | 429/483 |

(Continued)

FOREIGN PATENT DOCUMENTS

| | | |
|---|---|---|
| JP | 2002-324557 | 11/2002 |
| JP | 2006-131846 | 5/2006 |

(Continued)

OTHER PUBLICATIONS

International Search Report issued May 7, 2013 in Application No. PCT/JP2013/051511 (With English Translation of Category of Cited Documents).

(Continued)

*Primary Examiner* — Peter D Mulcahy
*Assistant Examiner* — Henry Hu
(74) *Attorney, Agent, or Firm* — Oblon, McClelland, Maier & Neustadt, L.L.P.

(57) ABSTRACT

To provide a process for forming a polymer electrolyte membrane having good durability and few wrinkles, a polymer electrolyte membrane capable of forming a catalyst layer, or a catalyst layer; a process for producing a fluorinated ion exchange resin fluid, or a paste for forming a catalyst layer, which can be used for such a forming process; and a process for producing a membrane/electrode assembly for a polymer electrolyte fuel cell having good durability and power generation properties. A fluorinated ion exchange resin fluid obtained by subjecting a powder or pellets of a fluorinated ion exchange resin having cation exchange groups to hydrogen peroxide treatment, followed by mixing with a solvent, is used.

8 Claims, 1 Drawing Sheet

(52) U.S. Cl.
CPC ........ *H01M 8/1072* (2013.01); *H01M 4/8663* (2013.01); *Y02E 60/521* (2013.01); *Y02P 70/56* (2015.11)

(56) References Cited

U.S. PATENT DOCUMENTS

| | | | |
|---|---|---|---|
| 2007/0141427 A1* | 6/2007 | Hommura et al. | 429/33 |
| 2009/0004527 A1 | 1/2009 | Shimohira et al. | |
| 2009/0042067 A1 | 2/2009 | Honmura et al. | |
| 2009/0088539 A1 | 4/2009 | Kasahara et al. | |
| 2009/0246592 A1* | 10/2009 | Kinoshita | H01M 8/0291 429/483 |
| 2011/0091791 A1 | 4/2011 | Kasahara et al. | |
| 2014/0199604 A1* | 7/2014 | Avataneo | C08J 5/225 429/408 |

FOREIGN PATENT DOCUMENTS

| | | |
|---|---|---|
| JP | 2006-299092 | 11/2006 |
| JP | 2007-173109 | 7/2007 |
| JP | 2009-140667 | 6/2009 |
| JP | 2010-18674 | 1/2010 |
| JP | 2011-18530 | 1/2011 |
| WO | WO 2004/102714 A1 | 11/2004 |
| WO | WO 2005/096422 A1 | 10/2005 |
| WO | WO 2006/019097 A1 | 2/2006 |
| WO | WO 2008/050692 A1 | 5/2008 |
| WO | WO 2008/090990 A1 | 7/2008 |
| WO | WO 2009/116630 A1 | 9/2009 |

\* cited by examiner

PROCESS FOR PRODUCING FLUORINATED ION EXCHANGE RESIN FLUID

TECHNICAL FIELD

The present invention relates to a process for producing a fluorinated ion exchange resin fluid and a process for forming a polymer electrolyte membrane by using it; a process for producing a paste for forming a catalyst layer and a process for forming a catalyst layer by using it; and a process for producing a membrane/electrode assembly for a polymer electrolyte fuel cell.

A polymer electrolyte fuel cell is, for example, a stack of a plurality of cells each comprising a membrane/electrode assembly sandwiched between two separators. The membrane/electrode assembly is one comprising an anode and a cathode each having a catalyst layer and a gas diffusion layer, and a polymer electrolyte membrane disposed between the anode and the cathode. The catalyst layer and the polymer electrolyte membrane contain a fluorinated ion exchange resin having acid-form cation exchange groups.

If the fluorinated ion exchange resin contains organic substances other than the fluorinated ion exchange resin, as impurities, the durability of the polymer electrolyte membrane or the catalyst layer deteriorates. Therefore, it has been in practice to decompose such organic substances by immersing a polymer electrolyte membrane made of a fluorinated ion exchange resin having acid-form cation exchange groups, in an aqueous hydrogen peroxide solution (Patent Documents 1 and 2).

However, the method for immersing the polymer electrolyte membrane in an aqueous hydrogen peroxide solution has the following problems.

If the polymer electrolyte membrane is immersed in an aqueous hydrogen peroxide solution, the polymer electrolyte membrane undergoes swelling by water. If the swelled polymer electrolyte membrane is dried, wrinkles are likely to be formed on the polymer electrolyte membrane. If wrinkles are formed on the polymer electrolyte membrane, the adhesion to the catalyst layer tends to be incomplete, and gas is likely to leak at the interface between the catalyst layer and the polymer electrolyte membrane, whereby the power generation properties of the membrane/electrode assembly tend to be inadequate.

PRIOR ART DOCUMENTS

Patent Documents

Patent Document 1: JP-A-2007-173109
Patent Document 2: JP-A-2009-140667

SUMMARY OF INVENTION

Object to be Accomplished by the Invention

The present invention is to provide a process for forming a polymer electrolyte membrane having good durability and few wrinkles, a polymer electrolyte membrane capable of forming a catalyst layer, or a catalyst layer; a process for producing a fluorinated ion exchange resin fluid, or a paste for forming a catalyst layer, which can be used for such a forming process; and a process for producing a membrane/electrode assembly for a polymer electrolyte fuel cell having good durability and power generation properties.

Means to Accomplish the Object

The process for producing a fluorinated ion exchange resin fluid of the present invention, comprises subjecting a powder or pellets of a fluorinated ion exchange resin having cation exchange groups to hydrogen peroxide treatment, followed by mixing with a solvent.

The cation exchange groups may be salt-form cation exchange groups or acid-form cation exchange groups, and are preferably salt-form cation exchange groups.

In the process for producing a fluorinated ion exchange resin fluid of the present invention, it is preferred that a powder or pellets of a fluorinated ion exchange resin having salt-form cation exchange groups are subjected to hydrogen peroxide treatment and further to acid-form conversion treatment, and then mixed with the solvent.

The fluorinated ion exchange resin is preferably a perfluorocarbon polymer having cation exchange groups.

In the process for producing a fluorinated ion exchange resin fluid of the present invention, it is preferred that the hydrogen peroxide treatment is carried out by dispersing the powder or pellets of the fluorinated ion exchange resin in an aqueous hydrogen peroxide solution.

The process for forming a polymer electrolyte membrane of the present invention, comprises applying a fluorinated ion exchange resin fluid obtained by the process of the present invention, on an object to be coated, followed by drying to form a polymer electrolyte membrane.

The process for producing a paste for forming a catalyst layer of the present invention, comprises mixing a fluorinated ion exchange resin fluid obtained by the process of the present invention, with a catalyst or a dispersion of a catalyst.

The process for forming a catalyst layer of the present invention, comprises applying a paste for forming a catalyst layer obtained by the process of the present invention, on an object to be coated, followed by drying to form a catalyst layer.

The process for producing a membrane/electrode assembly for a polymer electrolyte fuel cell of the present invention is a process for producing a membrane/electrode assembly for a polymer electrolyte fuel cell comprising an anode having a catalyst layer, a cathode having a catalyst layer, and a polymer electrolyte membrane disposed between the anode and the cathode, which comprises forming the polymer electrolyte membrane by the process for forming a polymer electrolyte membrane of the present invention, or forming each catalyst layer by the process for forming a catalyst layer of the present invention.

Advantageous Effects of the Invention

According to the process for producing a fluorinated ion exchange resin fluid of the present invention, it is possible to produce a fluorinated ion exchange resin fluid which is useful for a process for forming a polymer electrolyte membrane of the present invention.

According to the process for forming a polymer electrolyte membrane of the present invention, it is possible to produce a polymer electrolyte membrane having good durability and few wrinkles.

According to the process for producing a paste for forming a catalyst layer of the present invention, it is possible to produce a paste for forming a catalyst layer which is useful for a process for forming a catalyst layer of the present invention.

According to the process for forming a catalyst layer of the present invention, it is possible to produce a catalyst layer having good durability and few wrinkles.

According to the process for producing a membrane/electrode assembly for a polymer electrolyte fuel cell of the present invention, it is possible to produce a membrane/electrode assembly for a polymer electrolyte fuel cell having good durability and power generation properties.

BEST MODE FOR CARRYING OUT THE INVENTION

Figure 1:
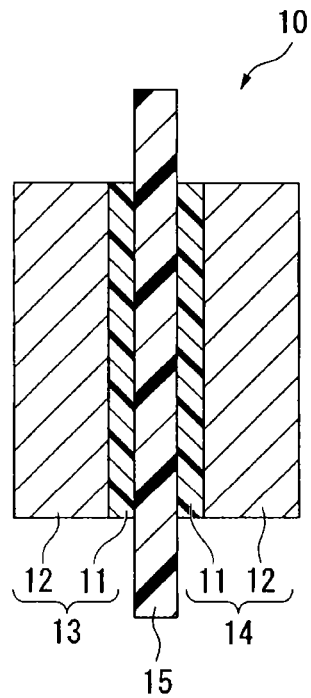
FIG. 1 is a cross-sectional view illustrating one example of a membrane/electrode assembly.

In the present specification, repeating units represented by the formula (u1) will be referred to as units (u1). Repeating units represented by other formulae will be referred to in the same manner.

Further, a monomer represented by the formula (m1) will be referred to as a monomer (m1). Monomers represented by other formulae will be referred to in the same manner.

In the present specification, repeating units are units derived from a monomer, formed by polymerization of the monomer. The repeating units may be units directly formed by the polymerization reaction, or may be units having part of such units converted to another structure by treating the polymer.

Further, a monomer is a compound having a polymerizable carbon-carbon double bond.

Further, a cation exchange group is a group in which part of cations contained, is ion-exchangeable to another cation.

Further, a precursor group is a group capable of being converted to a cation exchange group by a known treatment such as hydrolytic treatment or treatment for conversion to an acid-form.

<Fluorinated Ion Exchange Resin Fluid>

The fluorinated ion exchange resin fluid obtainable by the process for producing a fluorinated ion exchange resin fluid of the present invention, is one having dispersed or dissolved in a solvent a powder or pellets of a fluorinated ion exchange resin having cation exchange groups, treated with hydrogen peroxide.

(Fluorinated Ion Exchange Resin)

A fluorinated ion exchange resin is a fluorinated polymer having cation exchange groups.

The cation exchange groups include an acid-form wherein the cation is $H^+$ and a salt-form in which the cation is a metal ion, an ammonium ion or the like. In the case of a catalyst layer or a polymer electrolyte membrane in a membrane/electrode assembly for a polymer electrolyte fuel cell (hereinafter referred to also as a membrane/electrode assembly), a fluorinated ion exchange resin having acid-form cation exchange groups is usually used.

The cation exchange groups may, for example, be $-SO_3^- Z^+$, $-SO_2N^-(Z^+)-$, $-SO_2C^-(Z^+)<$, $-P(O)(O^-Z^+)_2$, $-C(O)O^-Z^+$ or $>C=N^-Z^+$ (where $Z^+$ is $H^+$, a monovalent metal, or an ammonium ion wherein one or more hydrogen atoms may be substituted by hydrocarbon groups), and when the fluorinated ion exchange resin is used for a catalyst layer or a polymer electrolyte membrane in a membrane/electrode assembly, the cation exchange groups are preferably $-SO_3^- H^+$, $-SO_2N^-(H^+)-$ or $-SO_2C^-(H^+)<$, more preferably $-SO_3^- H^+$ or $-SO_2N^-(H^+)-$, particularly preferably $-SO_3^- H^+$. Part of $Z^+$ in the ion exchange groups may be substituted by a bivalent or higher valent metal ion.

From the viewpoint of durability, the fluorinated ion exchange resin is preferably a perfluorocarbon polymer (which may have an etheric oxygen atom) having cation exchange groups.

The fluorinated ion exchange resin may, for example, be a polymer (H1) having after-described units (u1), a polymer (H2) having after-described units (u2), a polymer (H3) having after-described units (u3), a polymer (H4) having after-described units (u4), a polymer (H5) having after-described units (u5), or a polymer (H6) having after-described units (u6) (hereinafter polymers (H1) to (H6) may generally be referred to as polymer (H)).

(Polymer (H1))

The polymer (H1) is a fluoropolymer having units (u1) (provided that polymers (H2) to (H6) are excluded).

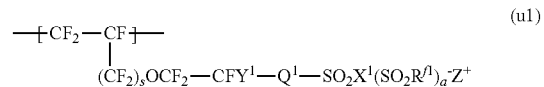
(u1)

Here, $Q^1$ is a single bond or a perfluoroalkylene group which may have an etheric oxygen atom, $Y^1$ is a fluorine atom or a monovalent perfluoro organic group, s is 0 or 1, $R^{f1}$ is a perfluoroalkyl group which may have an etheric oxygen atom, $X^1$ is an oxygen atom, a nitrogen atom or a carbon atom, a is 0 when $X^1$ is an oxygen atom, 1 when $X^1$ is a nitrogen atom, or 2 when $X^1$ is a carbon atom, and $Z^+$ is $H^+$, a monovalent metal ion or an ammonium ion wherein one or more hydrogen atoms may be substituted by hydrocarbon groups. The single bond means that a carbon atom in $CFY^1$ and the sulfur atom in $SO_2$ are directly bonded. The organic group means a group containing at least one carbon atom.

Units (u1):

In a case where the perfluoroalkylene group for $Q^1$ has an etheric oxygen atom, the number of such oxygen atoms may be one or more. Further, such an oxygen atom may be inserted between the carbon atom-carbon atom bond of the perfluoroalkylene group, or may be inserted at the terminal of the carbon atom bond.

The perfluoroalkylene group may be linear or branched.

The number of carbon atoms in the perfluoroalkylene group is preferably from 1 to 6, more preferably from 1 to 4. When the number of carbon atoms is at most 6, a decrease in the ion exchange capacity of the polymer (H1) can be suppressed, and a decrease in the proton conductivity can be suppressed.

The perfluoroalkyl group for $R^{f1}$ may be linear or branched, preferably linear.

The number of carbon atoms in the perfluoroalkyl group is preferably from 1 to 6, more preferably from 1 to 4. The perfluoroalkyl group is preferably a perfluoromethyl group, a perfluoroethyl group or the like.

$-SO_2X^1(SO_2R^{f1})_a^- Z^+$ may be $-SO_3^- Z^+$, $-SO_2N(SO_2R^{f1})^- Z^+$ or $-SO_2C(SO_2R^{f1})_2^- Z^+$.

$Y^1$ is preferably a fluorine atom or a trifluoromethyl group.

The units (u1) are preferably units (u1-1) to (u1-4), in view of easiness of production of the polymer (H1) and easiness of industrial application.

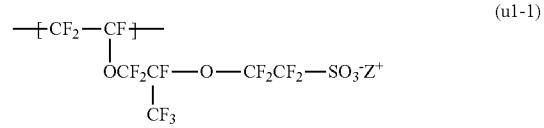
(u1-1)

-continued

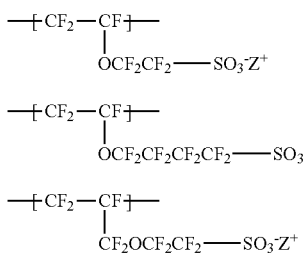

Other Units:

The polymer (H1) may further have repeating units based on after-described other monomers (hereinafter referred to also as other units). The proportion of such other units may suitably be adjusted so that the ion exchange capacity of the polymer (H1) will be within the after-described preferred range.

Such other units are preferably repeating units based on a perfluoromonomer, more preferably repeating units based on tetrafluoroethylene (hereinafter referred to as TFE) from the viewpoint of the mechanical strength and chemical durability.

The polymer (H1) may have one or more types of each of the units (u1) and other units.

The polymer (H1) is preferably a perfluorocarbon polymer from the viewpoint of the chemical durability.

The ion exchange capacity of the polymer (H1) is preferably from 0.5 to 1.8 meq/g dry resin, more preferably from 0.9 to 1.5 meq/g dry resin. When the ion exchange capacity is at least 0.5 meq/g dry resin, the proton conductivity becomes high, whereby an adequate cell output can be obtained. When the ion exchange capacity is at most 1.8 meq/g dry resin, it is easy to prepare a polymer having a high molecular weight, and the polymer (H1) will not excessively be swelled with water, whereby the mechanical strength can be maintained.

(Polymer (H2))

The polymer (H2) is a fluoropolymer having units (u2) (provided that polymers (H3) to (H6) are excluded).

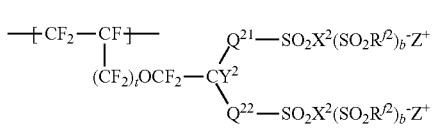

Here, $Q^{21}$ is a perfluoroalkylene group which may have an etheric oxygen atom, $Q^{22}$ is a single bond or a perfluoroalkylene group which may have an etheric oxygen atom, $Y^2$ is a fluorine atom or a monovalent perfluoro organic group, t is 0 or 1, $R^{f2}$ is a perfluoroalkyl group which may have an etheric oxygen atom, $X^2$ is an oxygen atom, a nitrogen atom or a carbon atom, b is 0 when $X^2$ is an oxygen atom, 1 when $X^2$ is a nitrogen atom, and 2 when $X^2$ is a carbon atom, and $Z^+$ is $H^+$, a monovalent metal ion, or an ammonium ion wherein one or more hydrogen atoms may be substituted by hydrocarbon groups. The single bond means that a carbon atom in $CY^1$ or $CY^2$ and the sulfur atom in $SO_2$ are directly bonded. The organic group means a group containing at least one carbon atom.

Units (u2):

The perfluoroalkylene group for $Q^{21}$ or $Q^{22}$ has an etheric oxygen atom, the number of such oxygen atoms may be one or more. Further, such an oxygen atom may be inserted between the carbon atom-carbon atom bond of the perfluoroalkylene group, or may be inserted at the terminal of the carbon atom bond.

The perfluoroalkylene group may be linear or branched, preferably linear.

The number of carbon atoms in the perfluoroalkylene group is preferably from 1 to 6, more preferably from 1 to 4. When the number of carbon atoms is at most 6, the boiling point of the raw material fluoromonomer tends to be low, whereby purification by distillation becomes easy. Further, when the number of carbon atoms is at most 6, a decrease in the ion exchange capacity of the polymer (H2) can be suppressed, and a decrease in the proton conductivity can be suppressed.

$Q^{22}$ is preferably a $C_{1-6}$ perfluoroalkylene group which may have an etheric oxygen atom. When $Q^{22}$ is a $C_{1-6}$ perfluoroalkylene group which may have an etheric oxygen atom, the polymer electrolyte fuel cell will be excellent in the stability of the power generation property when operated for a long period of time, as compared with a case where $Q^{22}$ is a single bond.

At least one of $Q^{21}$ and $Q^{22}$ is preferably a $C_{1-6}$ perfluoroalkylene group having an etheric oxygen atom. A fluoromonomer having a $C_{1-6}$ perfluoroalkylene group having an etheric oxygen atom can be prepared without via a fluorination reaction with fluorine gas, whereby the yield is good, and the production is easy.

The perfluoroalkyl group for $R^{f2}$ may be linear or branched, preferably linear.

The number of carbon atoms in the perfluoroalkyl group is preferably from 1 to 6, more preferably from 1 to 4. The perfluoroalkyl group is preferably a perfluoromethyl group, a perfluoroethyl group or the like.

When a unit (u2) has two or more $R^{f2}$, the plurality of $R^{f2}$ may be the same groups or different groups.

—$SO_2X^2(SO_2R^{f2})_b^-Z^+$ may be —$SO_3^-Z^+$, —$SO_2N(SO_2R^{f2})^-Z^+$ or —$SO_2C(SO_2R^{f2})_2^-Z^+$.

$Y^2$ is preferably a fluorine atom or a $C_{1-6}$ linear perfluoroalkyl group which may have an etheric oxygen atom.

The units (u2) are preferably units (u2-1) to (u2-3), in view of easiness of production of the polymer (H2) and easiness of industrial application.

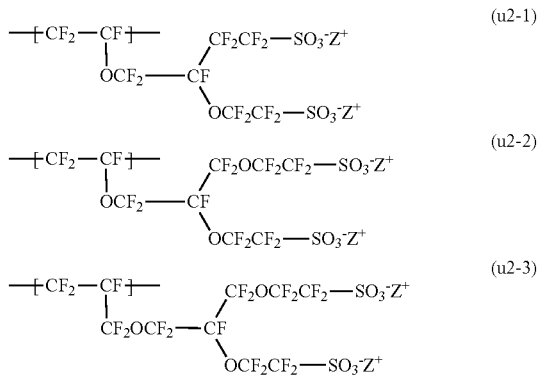

Other Units:

The polymer (H2) may further have repeating units based on after-described other monomers. Further, it may have the above-mentioned units (u1). The proportion of such other units may suitably be adjusted so that the ion exchange capacity of the polymer (H2) will be within the after-described preferred range.

Such other units are preferably repeating units based on a perfluoromonomer, more preferably repeating units based on TFE, from the viewpoint of the mechanical strength and chemical durability.

The polymer (H2) may have one or more types of each of the units (u2) and other units.

The polymer (H2) is preferably a perfluorocarbon polymer from the viewpoint of the chemical durability.

The ion exchange capacity of the polymer (H2) is preferably from 0.5 to 2.8 meq/g dry resin, more preferably from 0.9 to 2.2 meq/g dry resin. When the ion exchange capacity is at least 0.5 meq/g dry resin, the proton conductivity becomes high, whereby an adequate cell output can be obtained. When the ion exchange capacity is at most 2.8 meq/g dry resin, it is easy to prepare a polymer having a high molecular weight, and the polymer (H2) will not excessively be swelled with water, whereby the mechanical strength can be maintained.

(Polymer (H3))

The polymer (H3) is a fluoropolymer having units (u3) (provided that polymers (H4) to (H6) are excluded).

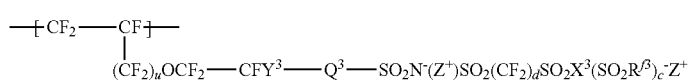

Here, $Q^3$ is a single bond or a perfluoroalkylene group which may have an etheric oxygen atom, and $Y^3$ is a fluorine atom or a monovalent perfluoro organic group, u is 0 or 1, $R^{f3}$ is a $C_{1-10}$ perfluoroalkyl group which may have an etheric oxygen atom, $X^3$ is an oxygen atom or a nitrogen atom, c is 0 when $X^3$ is an oxygen atom and 1 when $X^3$ is a nitrogen atom, d is an integer of from 1 to 4, and $Z^+$ is $H^+$, a monovalent metal ion, or an ammonium ion wherein one or more hydrogen atoms may be substituted by hydrocarbon groups. The single bond means that a carbon atom in $CY^3$ and the sulfur atom in $SO_2$ are directly bonded. The organic group means a group containing at least one carbon atom.

Units (u3):

In a case where the perfluoroalkylene group for $Q^3$ has an etheric oxygen atom, the number of such oxygen atoms may be one or more. Further, such an oxygen atom may be inserted between the carbon atom-carbon atom bond of the perfluoroalkylene group, or may be inserted at the terminal of the carbon atom bond.

The perfluoroalkylene group may be linear or branched.

The number of carbon atoms in the perfluoroalkylene group is preferably from 1 to 10, more preferably from 1 to 6, further preferably from 1 to 4. When the number of carbon atoms is at most 10, a decrease in the ion exchange capacity of the polymer (H3) can be suppressed, and a decrease in the proton conductivity can be suppressed.

The perfluoroalkyl group for $R^{f3}$ may be linear or branched, preferably linear.

The number of carbon atoms in the perfluoroalkyl group is preferably from 1 to 6, more preferably from 1 to 4. The perfluoroalkyl group is preferably a perfluoromethyl group, a perfluoroethyl group or the like.

$—SO_2X^3(SO_2R^{f3})_c^-Z^+$ may be $—SO_3^-Z^+$, $—SO_2N(SO_2R^{f3})^-Z^+$ or $—SO_2C(SO_2R^{f3})_2^-Z^+$.

$Y^3$ is preferably a fluorine atom or a trifluoromethyl group.

d is particularly preferably 2 in that the preparation of the monomer (m3) is easy, and a polymer (H3) having a high ion exchange capacity can be obtained.

The units (u3) are preferably units (u3-1) to (u3-4), in view of easiness of production of the polymer (H3) and easiness of industrial application.

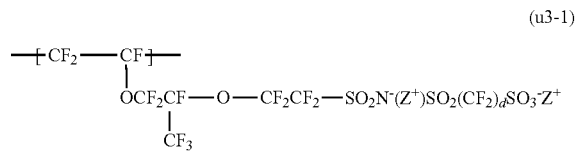

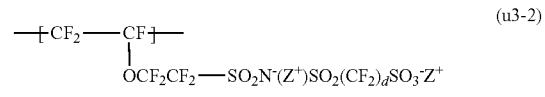

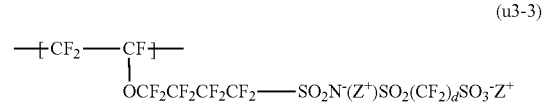

-continued

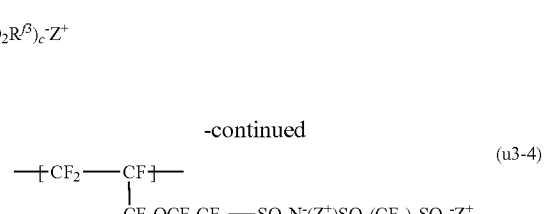

Other Units:

The polymer (H3) may further has repeating units based on after-described other monomers. Further, it may have the above units (u1) and/or units (u2). The proportion of such other units may suitably be adjusted so that the ion exchange capacity of the polymer (H3) will be within the after-described preferred range.

Such other units are preferably repeating units based on a perfluoromonomer, more preferably repeating units based on TFE, from the viewpoint of the mechanical strength and chemical durability.

The polymer (H3) may have one or more types of each of the units (u3) and other units.

The polymer (H3) is preferably a perfluorocarbon polymer from the viewpoint of the chemical durability.

The ion exchange capacity of the polymer (H3) is preferably from 0.5 to 2.8 meq/g dry resin, more preferably from 0.9 to 2.2 meq/g dry resin. When the ion exchange capacity is at least 0.5 meq/g dry resin, the proton conductivity becomes high, whereby an adequate cell output can be obtained. When the ion exchange capacity is at most 2.8 meq/g dry resin, it is easy to prepare a polymer having a high molecular weight, and the polymer (H3) will not excessively be swelled with water, whereby the mechanical strength can be maintained.

(Polymer (H4))

The polymer (H4) is a fluoropolymer having units (u4) (provided that polymers (H5) and (H6) are excluded).

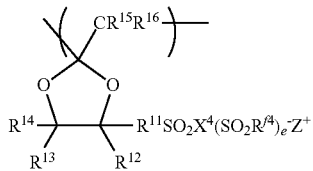
(u4)

Here, $R^{11}$ is a bivalent perfluoro organic group, which may have an etheric oxygen atom, each of $R^{12}$, $R^{13}$, $R^{15}$ and $R^{16}$ which are independent of one another, is a monovalent perfluoro organic group which may have an etheric oxygen atom, or a fluorine atom, $R^{14}$ is a monovalent perfluoro organic group which may have an etheric oxygen atom, a fluorine atom or a —$R^{11}(SO_2X^4(SO_2R^{f4})_e)^-Z^+$ group, $R^{f4}$ is a perfluoroalkyl group which may have an etheric oxygen atom, $X^4$ is an oxygen atom, a nitrogen atom or a carbon atom, e is 0 when $X^4$ is an oxygen atom, 1 when $X^4$ is a nitrogen atom, and 2 when $X^4$ is a carbon atom, and $Z^+$ is $H^+$, a monovalent metal ion, or an ammonium ion wherein one or more hydrogen atoms may be substituted by hydrocarbon groups. The organic group means a group having at least one carbon atom.

Units (u4):

The bivalent perfluoro organic group for $R^{11}$ is preferably a perfluoroalkylene group. In a case where the perfluoroalkylene group has an etheric oxygen atom, the number of such oxygen atoms may be one or more. Further, such an oxygen atom may be inserted between the carbon-carbon bond or may be inserted at the terminal of a carbon atom bond, in the perfluoroalkylene group. The perfluoroalkylene group may be linear or branched, preferably linear.

The monovalent perfluoro organic group for $R^{12}$, $R^{13}$, $R^{15}$ or $R^{16}$ is preferably a perfluoroalkyl group. It is preferred that at least one of $R^{15}$ and $R^{16}$ is a fluorine atom, and it is more preferred that both of them are fluorine atoms, from such a viewpoint that the polymerization reactivity is thereby high.

The monovalent perfluoro organic group for $R^{14}$ is preferably a perfluoroalkyl group. In a case where the perfluoroalkyl group has an etheric oxygen atom, the number of such oxygen atoms may be one or more. Further, such an oxygen atom may be inserted between the carbon-carbon bond or may be inserted at the terminal of a carbon atom bond, in the perfluoroalkyl group. The perfluoroalkyl group may be linear or branched, preferably linear. In a case where a unit (u4) has two $R^{11}$, the two $R^{11}$ may be the same groups or different groups.

The number of carbon atoms of the perfluoroalkyl group for $R^{14}$ is preferably from 1 to 8, more preferably from 1 to 6. When two or more $R^{14}$ are present, the plurality of $R^{14}$ may be the same groups or different groups.

—$SO_2X^4(SO_2R^{f4})_e^-Z^+$ may be —$SO_3^-Z^+$, —$SO_2N(SO_2R^{f4})^-H^+$ or —$SO_2C(SO_2R^{f4})_2^-Z^+$.

The units (u4) may be units (u4-1) to (u4-4) and are preferably units (u4-1) in view of easiness of production of the polymer (H4) and easiness of industrial application.

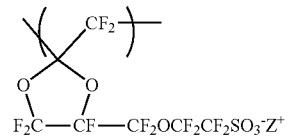
(u4-1)

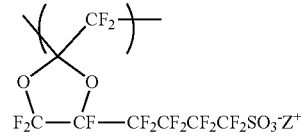
(u4-2)

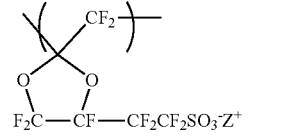
(u4-3)

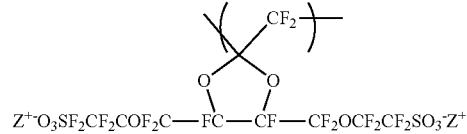
(u4-4)

Other Units:

The polymer (H4) may further have repeating units based on after-described other monomers. Further, it may have the above units (u1), units (u2) and/or units (u3). The proportion of such other units may suitably be adjusted so that the ion exchange capacity of the polymer (H4) will be within the after-mentioned preferred range.

Such other units are preferably repeating units based on a perfluoromonomer, more preferably repeating units based on a perfluoromonomer which has a cyclic structure and which does not have a cation exchange group or its precursor group, whereby the polymer (H4) will not excessively be swelled with water.

Such other units are preferably repeating units based on a perfluoromonomer, more preferably repeating units based on TFE, from the viewpoint of the mechanical strength and chemical durability.

The polymer (H4) may have one or more types of each of the units (u4) and other units.

The polymer (H4) is preferably a perfluorocarbon polymer from the viewpoint of the chemical durability.

The ion exchange capacity of the polymer (H4) is preferably from 0.7 to 2.3 meq/g dry resin, more preferably from 1.1 to 2.0 meq/g dry resin. When the ion exchange capacity is at least 0.7 meq/g dry resin, the proton conductivity becomes high, whereby an adequate cell output can be obtained. When the ion exchange capacity is at most 2.3 meq/g dry resin, it is easy to prepare a polymer having a high molecular weight, and the polymer (H4) will not excessively be swelled with water, whereby the mechanical strength can be maintained.

(Polymer (H5))

The polymer (H5) is a fluoropolymer having units (u5) (provided that polymer (H6) is excluded).

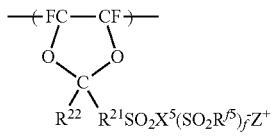

Here, $R^{21}$ is a $C_{1-6}$ perfluoroalkylene group or a $C_{2-6}$ perfluoroalkylene group having an etheric oxygen atom between a carbon-carbon bond, $R^{22}$ is a fluorine atom, a $C_{1-6}$ perfluoroalkyl group, a $C_{2-6}$ perfluoroalkyl group having an etheric oxygen atom between a carbon-carbon bond, or a $-R^{21}(SO_2X^5(SO_2R^{f5})_f)^-Z^+$ group, $R^{f5}$ is a perfluoroalkyl group which may have an etheric oxygen atom, $X^5$ is an oxygen atom, a nitrogen atom or a carbon atom, f is 0 when $X^5$ is an oxygen atom, 1 when $X^5$ is a nitrogen atom, and 2 when $X^5$ is a carbon atom, and $Z^+$ is $H^+$, a monovalent metal ion, or an ammonium ion wherein one or more hydrogen atoms may be substituted by hydrocarbon groups. The organic group means a group having at least one carbon atom.

Units (u5):

In a case where the perfluoroalkylene group for $R^{21}$ has an etheric oxygen atom, the number of such oxygen atoms may be one or more. The perfluoroalkylene group may be linear or branched, preferably linear.

In a case where the perfluoroalkyl group for $R^{22}$ has an etheric oxygen atom, the number of such oxygen atoms may be one or more. The perfluoroalkyl groups may be linear or branched, preferably linear. When a unit (u5) has two $R^{21}$, such two $R^{21}$ may be the same groups or different groups.

The number of carbon atoms in the perfluoroalkyl group for $R^{f5}$ is preferably from 1 to 8, more preferably from 1 to 6. When two or more $R^{f5}$ are present, the plurality of $R^{f5}$ may be the same groups or different groups.

$SO_2X^5(SO_2R^{f5})_f^-Z^+$ may be $-SO_3^-Z^+$, $-SO_2N(SO_2R^{f5})^-H^+$ or $SO_2C(SO_2R^{f5})_2^-Z^+$.

The units (u5) may be units (u5-1) and (u5-2).

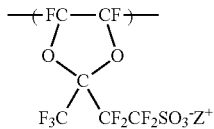

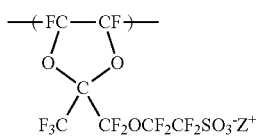

Other Units:

The polymer (H5) may further have repeating units based on after-described other monomers. Further, it may have the above units (u1), units (u2), units (u3) and/or units (u4). The proportion of such other units may suitably be adjusted so that the ion exchange capacity of the polymer (H5) will be within the after-mentioned preferred range.

Such other units are preferably repeating units based on a perfluoromonomer, more preferably repeating units based on a perfluoromonomer which has a cyclic structure and which does not have a cation exchange group or its precursor group, whereby the polymer (H5) will not excessively be swelled with water.

Such other units are preferably repeating units based on a perfluoromonomer, more preferably repeating units based on TFE, from the viewpoint of the mechanical strength and chemical durability.

The polymer (H5) may have one or more types of each of the units (u5) and other units.

The polymer (H5) is preferably a perfluorocarbon polymer from the viewpoint of the chemical durability.

The ion exchange capacity of the polymer (H5) is preferably from 0.7 to 2.3 meq/g dry resin, more preferably from 1.1 to 2.0 meq/g dry resin. When the ion exchange capacity is at least 0.7 meq/g dry resin, the proton conductivity becomes high, whereby an adequate cell output can be obtained. When the ion exchange capacity is at most 2.3 meq/g dry resin, it is easy to prepare a polymer having a high molecular weight, and the polymer (H5) will not excessively be swelled with water, whereby the mechanical strength can be maintained.

(Polymer (H6))

The polymer (H6) is a fluoropolymer having units (u6).

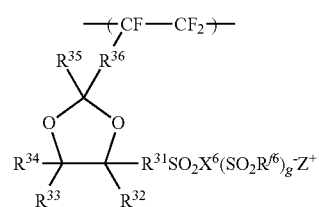

Here, $R^{31}$ is a $C_{1-6}$ perfluoroalkylene group or a $C_{2-6}$ perfluoroalkylene group having an etheric oxygen atom between a carbon-carbon bond, each of $R^{32}$ to $R^{35}$ which are independent of one another, is a fluorine atom, a $C_{1-6}$ perfluoroalkyl group or a $C_{2-6}$ perfluoroalkyl group having an etheric oxygen atom between a carbon-carbon bond, $R^{36}$ is a single bond, a $C_{1-6}$ perfluoroalkylene group, or a $C_{2-6}$ perfluoroalkylene group having an etheric oxygen atom between a carbon-carbon bond, $R^{f6}$ is a perfluoroalkyl group which may have an etheric oxygen atom, $X^6$ is an oxygen atom, a nitrogen atom or a carbon atom, g is 0 when $X^6$ is an oxygen atom, 1 when $X^6$ is a nitrogen atom, and 2 when $X^6$ is a carbon atom, and $Z^+$ is $H^+$, a monovalent metal ion, or an ammonium ion wherein one or more hydrogen atoms may be substituted by hydrocarbon groups. The organic group means a group containing at least one carbon atom.

Units (u6):

In a case where the perfluoroalkylene group for $R^{31}$ has an etheric oxygen atom, the number of such oxygen atoms may be one or more. The perfluoroalkylene group may be linear or branched, preferably linear.

In a case where the perfluoroalkyl group for each of $R^{32}$ to $R^{35}$ has an etheric oxygen atom, the number of such oxygen atoms may be one or more. The perfluoroalkyl groups may be linear or branched, preferably linear.

In a case where the perfluoroalkylene group for $R^{36}$ has an etheric oxygen atom, the number of such oxygen atoms may be one or more. The perfluoroalkylene group may be linear or branched, preferably linear.

The number of carbon atoms in the perfluoroalkyl group for $R^{f6}$ is preferably from 1 to 8, more preferably from 1 to 6.

—$SO_2X^6(SO_2R^{f6})_g^-Z^+$ may be —$SO_3^-Z^+$, —$SO_2N(SO_2R^{f6})^-H^+$ or —$SO_2C(SO_2R^{f6})_2^-Z^+$.

The units (u6) may be units (u6-1) and (u6-2).

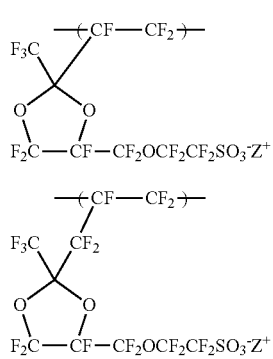

Other Units:

The polymer (H6) may further have repeating units based on after-described other monomers. Further, it may have the above units (u1), units (u2), units (u3), units (u4) and/or units (u5). The proportion of such other units may suitably be adjusted so that the ion exchange capacity of the polymer (H6) will be within the after-mentioned preferred range.

Such other units are preferably repeating units based on a perfluoromonomer, more preferably repeating units based on a perfluoromonomer which has a cyclic structure and which does not have a cation exchange group or its precursor group, whereby the polymer (H6) will not excessively be swelled with water.

The polymer (H6) may have one or more types of each of the units (u6) and other units.

The polymer (H6) is preferably a perfluorocarbon polymer from the viewpoint of the chemical durability.

Such other units are preferably repeating units based on a perfluoromonomer, more preferably repeating units based on TFE, from the viewpoint of the mechanical strength and chemical durability.

The ion exchange capacity of the polymer (H6) is preferably from 0.7 to 2.3 meq/g dry resin, more preferably from 1.1 to 2.0 meq/g dry resin. When the ion exchange capacity is at least 0.7 meq/g dry resin, the proton conductivity becomes high, whereby an adequate cell output can be obtained. When the ion exchange capacity is at most 2.3 meq/g dry resin, it is easy to prepare a polymer having a high molecular weight, and the polymer (H6) will not excessively be swelled with water, whereby the mechanical strength can be maintained.

(Solvent)

The solvent may be a mixed solvent of water and an organic solvent having a hydroxy group.

The organic solvent having a hydroxy group may, for example, be methanol, ethanol, 1-propanol, 2-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol or 3,3,4,4,5,5,6,6,7,7,8,8-tridecafluoro-1-octanol. Such organic solvents having a hydroxy group may be used alone or in combination as a mixture of two or more of them.

The proportion of water is preferably from 10 to 99 mass %, more preferably from 40 to 99 mass %, in the mixed solvent (100 mass %). By increasing the proportion of water, the dispersibility of the polymer (H) in the mixed solvent can be improved.

The proportion of the organic solvent having a hydroxy group is preferably from 1 to 90 mass %, more preferably from 1 to 60 mass %, in the mixed solvent (100 mass %).

The proportion of the polymer (H) is preferably from 1 to 50 mass %, more preferably from 3 to 30 mass %, in the fluorinated ion exchange resin fluid (100 mass %).

<Process for Producing Fluorinated Ion Exchange Resin Fluid>

The process for producing a fluorinated ion exchange resin fluid of the present invention is a process which comprises subjecting a powder or pellets of a fluorinated ion exchange resin having cation exchange groups to hydrogen peroxide treatment, followed by mixing with a solvent.

In a case where the cation exchange groups of the fluorinated ion exchange resin finally contained in the fluorinated ion exchange resin fluid are in an acid-form, the process for producing the fluorinated ion exchange resin fluid of the present invention may be the following process (α) or (β) depending upon whether the cation exchange groups of the fluorinated ion exchange resin fluid to be treated by hydrogen peroxide treatment are in a salt form or in an acid form, and the process (α) is preferred from such a viewpoint that, as described hereinafter, the number of steps from the preparation of the precursor polymer having precursor groups for the cation exchange groups to obtaining of a fluorinated ion exchange resin fluid containing fluorinated ion exchange resin having acid-form cation exchange groups is small.

(α) A process of subjecting a powder or pellets of a fluorinated ion exchange resin having salt-form cation exchange groups to hydrogen peroxide treatment and further to acid-form conversion treatment, followed by mixing with a solvent.

(β) A process of subjecting a powder or pellets of a fluorinated ion exchange resin having acid-form cation exchange groups to hydrogen peroxide treatment, followed by mixing with a solvent.

Now, the processes (α) and (β) will be described in detail with reference to a case wherein cation exchange groups of the fluorinated ion exchange resin finally contained in the fluorinated ion exchange resin fluid are —$SO_3^-H^+$.

<Process (α)>

The process (α) may specifically be a process comprising the following steps (α1) to (α8).

(α1) A step of obtaining a powder or pellets of a precursor polymer (hereinafter referred to as polymer (F)) having —$SO_2F$ (precursor groups for cation exchange groups).

(α2) A step of subjecting the powder or pellets of polymer (F) to hydrolytic treatment to convert —$SO_2F$ to —$SO_3^-M^+$ (where $M^+$ is a monovalent metal ion, or an ammonium ion wherein one or more hydrogen atoms may be substituted by hydrocarbon groups) to obtain a powder or pellets of salt-form polymer (H).

(α3) A step of washing the powder or pellets of the salt-form polymer (H) with water.

(α4) A step of subjecting the powder or pellets of the salt-form polymer (H) to hydrogen peroxide treatment.

(α5) A step of washing the powder or pellets of the hydrogen peroxide-treated salt-form polymer (H) with water.

(α6) A step of subjecting the powder or pellets of the hydrogen peroxide-treated salt-form polymer (H) to acid-form conversion treatment to convert —SO$_3$_M$^+$ to —SO$_3^-$H$^+$ and thereby to obtain a powder or pellets of acid-form polymer (H).

(α7) A step of washing the powder or pellets of the acid-form polymer (H), followed by drying.

(α8) A step of mixing the powder or pellets of the acid-form polymer (H) with a solvent to obtain a fluorinated ion exchange resin fluid.

(Step (α1))

Preparation of Polymer (F1):

The polymer (F1) as a precursor polymer for the polymer (H1) may be obtained by polymerizing a monomer (m1) and, as the case requires, other monomers.

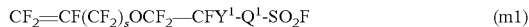
CF$_2$=CF(CF$_2$)$_x$OCF$_2$—CFY$^1$-Q$^1$-SO$_2$F    (m1)

The monomer (m1) is preferably monomers (m1-1) to (m1-4).

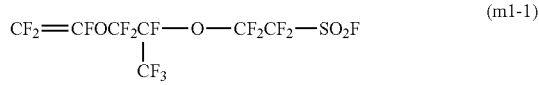
(m1-1)
CF$_2$=CFOCF$_2$CF—O—CF$_2$CF$_2$—SO$_2$F
          |
          CF$_3$ CF$_2$=CFOCF$_2$CF$_2$—SO$_2$F    (m1-2)

CF$_2$=CFOCF$_2$CF$_2$CF$_2$CF$_2$—SO$_2$F    (m1-3)

CF$_2$=CFCF$_2$OCF$_2$CF$_2$—SO$_2$F    (m1-4)

The monomer (m1) can be produced by known preparation methods such as a method disclosed by D. J. Vaugham in "Du Pont Inovation", vol. 43, No. 3, 1973, p. 10, a method disclosed in Examples in U.S. Pat. No. 4,358,412, etc.

Other monomers may, for example, be TFE, chlorotrifluoroethylene, trifluoroethylene, vinylidene fluoride, vinyl fluoride, ethylene, propylene, a perfluoro α-olefin (such as hexafluoropropylene), a (perfluoroalkyl)ethylene (such as (perfluorobutyl)ethylene), a (perfluoroalkyl)propene (such as 3-perfluorooctyl-1-propene), a perfluoro vinyl ether (such as perfluoro(alkyl vinyl ether) or a perfluoro(alkyl vinyl ether containing an etheric oxygen atom), a perfluoromonomer having a cyclic structure and not having a cation exchange group or its precursor group, or a cyclo-polymerizable perfluoromonomer not having a cation exchange group or its precursor and capable of forming a cyclic structure at the same time as polymerization.

The polymerization method may, for example, be a known polymerization method such as a bulk polymerization method, a solution polymerization method, a suspension polymerization method or an emulsion polymerization method. Further, the polymerization may be carried out in a liquid or supercritical carbon dioxide.

The polymerization is carried out under such conditions that radicals will be formed.

As a method for forming radicals, a method of irradiation with radiation such as ultraviolet ray, γ-ray, electron beam, etc., or a method of adding a radical initiator, may, for example, be mentioned.

Preparation of Polymer (F2):

The polymer (F2) as a precursor polymer for the above polymer (H2) may be obtained by polymerizing a monomer (m2) and, as the case requires, other monomers.

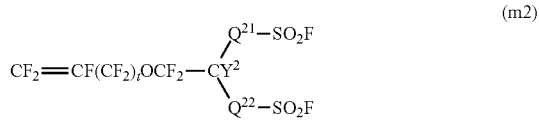
(m2)
CF$_2$=CF(CF$_2$)$_t$OCF$_2$—CY$^2$
                              / \
                         Q$^{21}$-SO$_2$F
                         Q$^{22}$-SO$_2$F The monomer (m2) is preferably monomers (m2-1) to (m2-3).

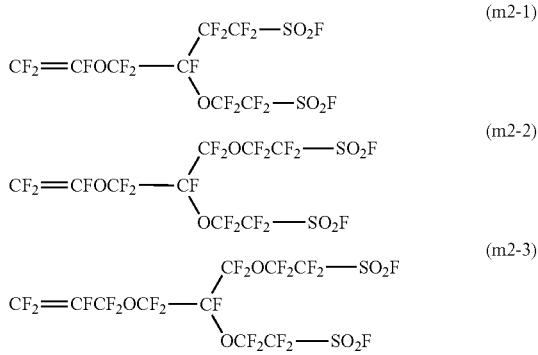

The monomer (m2) can be prepared by a known preparation method such as a method disclosed in WO/2007/013533.

Other monomers may, for example, be monomers exemplified in the method for producing polymer (F1).

The polymerization method may, for example, be a method similar to the polymerization method in the process for producing polymer (F1).

Preparation of Polymer (F3):

The polymer (F3) as a precursor polymer for the above polymer (H3) may, for example, be prepared via the following steps.

(i) A step of converting —SO$_2$F of the polymer (F) to —SO$_2$NH$_2$ to obtain polymer (I).

(ii) A step of reacting FSO$_2$(CF$_2$)$_d$SO$_2$F to the polymer (I) to convert —SO$_2$NH$_2$ to —SO$_2$N$^-$(H$^+$)SO$_2$(CF$_2$)$_d$SO$_2$F and to obtain polymer (F3).

Step (i):

The polymer (F) may, for example, be the above polymer (F1).

A method for converting —SO$_2$F to —SO$_2$NH$_2$ may be a method of contacting ammonia to polymer (F).

The method of contacting ammonia to the polymer (F) may, for example, be a method of directly contacting ammonia to the polymer (F), a method of bubbling by blowing ammonia to a polymer solution having the polymer (F) dissolved therein, or a method of contacting ammonia in such a state that the polymer (F) is swelled in a solvent.

Step (ii):

FSO$_2$(CF$_2$)$_d$SO$_2$F may be prepared by a known method. The preparation method may, for example, be the following method, in a case where d is 2.

A method wherein ICF$_2$CF$_2$I as an adduct of TFE and iodine is used as a starting material, and it is converted to NaSO$_2$CF$_2$CF$_2$SO$_2$Na by a known method, and then to ClSO$_2$CF$_2$CF$_2$SO$_2$Cl, and finally converted to FSO$_2$CF$_2$CF$_2$SO$_2$F.

A method wherein TFE and sulfuric anhydride are reacted to obtain tetrafluoroethane sulton, which is ring-opened and then hydrolyzed to FSO$_2$CF$_2$COOH, followed further by coupling by kolbe electrolysis (JP-A-2010-095470).

In step (ii), it is preferred that polymer (F) is swelled or dissolved in an aprotic polar solvent and then reacted with FSO$_2$(CF$_2$)$_d$SO$_2$F.

The aprotic polar solvent may, for example, be N,N-dimethylacetamide, N,N-dimethylformamide, 1,3-dimethyl-2-imidazolidinone, N-methyl-2-pyrrolidone, dimethylsulfoxide, sulfolane, γ-butyrolactone, acetonitrile, tetrahydrofuran or 1,4-dioxane.

At the time of reacting $FSO_2(CF_2)_aSO_2F$ to the polymer (F), it is also preferred to employ a reaction accelerator. As such a reaction accelerator, a tertiary organic amine is preferred.

In step (ii), it is preferred not to include moisture in order to prevent hydrolysis of $FSO_2(CF_2)_aSO_2F$.

Preparation of Polymer (F4):

The polymer (F4) as a precursor polymer for the above polymer (H4) may be obtained by polymerizing a monomer (m4) and, as the case requires, other monomers.

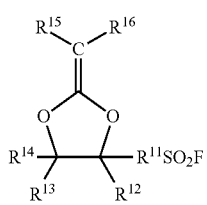
(m4)

The monomer (m4) is preferably monomers (m4-1) to (m4-4), and monomer (m4-1) is preferred in view of easiness of the preparation and a high polymerization reactivity.

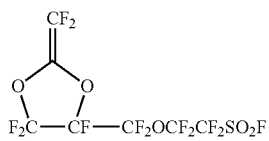
(m4-1)

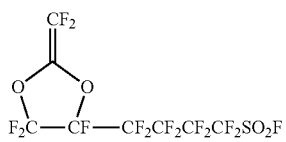
(m4-2)

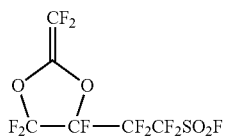
(m4-3)

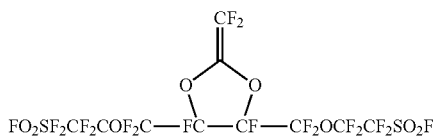
(m4-4)

The monomer (m4) can be prepared by methods disclosed in e.g. WO2003/037885, JP-A-2005-314388, JP-A-2009-040909, etc.

Other monomers may, for example, be monomers exemplified in the process for producing polymer (F1).

The polymerization method may be the same method as the polymerization method in the method for producing polymer (F1).

Preparation of Polymer (F5):

The polymer (F5) as a precursor polymer for the above polymer (H5) may be obtained by polymerizing a monomer (m5) and, as the case requires, other monomers.

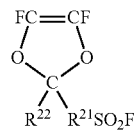
(m5)

The monomer (m5) may be monomers (m5-1) to (m5-2).

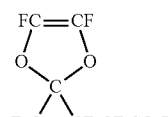
(m5-1)

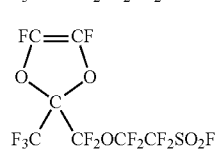
(m5-2)

The monomer (m5) may be prepared by methods disclosed in e.g. JPA-2006-152249.

Other monomers may, for example, be monomers exemplified in the process for producing polymer (F1).

The polymerization method may be the same method as the polymerization method in the method for producing polymer (F1).

Preparation of Polymer (F6):

The polymer (F6) as a precursor polymer for the above polymer (H6) may be obtained by polymerizing a monomer (m6) and, as the case requires, other monomers.

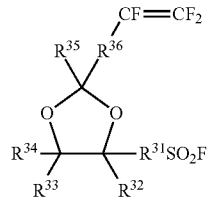
(m6)

The monomer (m6) may be monomers (m6-1) to (m6-2).

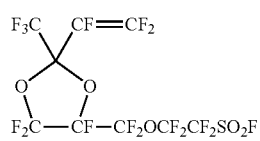
(m6-1)

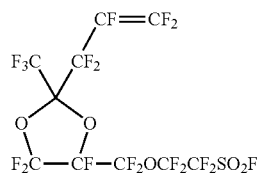
(m6-2)

The monomer (m6) may be prepared by methods disclosed in e.g. JPA-2006-241302.

Other monomers may, for example, be monomers exemplified in the method for producing polymer (F1).

The polymerization method may be the same method as the polymerization method in the method for producing polymer (F1).

Powder or Pellets of Polymer (F):

The powder of polymer (F) may, for example, be one obtained by recovering a polymer obtained by polymerizing a monomer by a known polymerization method, by a known method, or one obtained by pulverizing pellets of polymer (F).

The pellets of polymer (F) may, for example, be one obtained by recovering a polymer obtained by polymerizing a monomer by a known polymerization method, by a known method and melting and extruding it by an extruder to form strands, followed by cutting the strands by a pelletizer.

The pellets of polymer (F) preferably has a cross-sectional diameter of at most 3 mm, with a view to efficiently carrying out the after-described fluorination treatment, hydrolytic treatment, hydrogen peroxide treatment and acid-form conversion treatment.

The pellets of polymer (F) preferably has a length of at most 20 mm from the viewpoint of the handling efficiency.

Fluorination Treatment of Polymer (F):

As the case requires, the powder or pellets of polymer (F) may be contacted with fluorine gas to fluorinate unstable terminal groups of polymer (F).

The unstable terminal groups may, for example, be groups to be formed by a chain transfer reaction, or groups based on the radical initiator. Specifically, they may, for example, be —C(O)OH, —CF=CF$_2$, —C(O)F, —CF$_2$H, etc. By fluorinating or stabilizing such unstable terminal groups, decomposition of the finally obtainable polymer (H) can be suppressed, whereby the durability will be improved.

Fluorine gas may be used as it is without dilution, or by diluting it with an inert gas such as nitrogen, helium or carbon dioxide. The temperature at the time of contacting the powder or pellets of polymer (F) with fluorine gas is preferably from room temperature to 300° C., more preferably from 50 to 250° C., further preferably from 100 to 220° C., particularly preferably from 150 to 200° C.

The time for contacting the powder or pellets of polymer (F) with fluorine gas is preferably from one minute to one week, more preferably from 1 to 50 hours.

(Step (α2))

—SO$_2$F of polymer (F) is hydrolyzed to —SO$_3^-$M$^+$ thereby to obtain a salt-form polymer (H). Here, in the case of polymer (F3), —SO$_2$N$^-$(H$^+$)SO$_2$(CF$_2$)$_a$SO$_2$F will be converted to —SO$_2$N$^-$(M$^+$)SO$_2$(CF$_2$)$_2$SO$_3^-$M$^+$.

The hydrolytic treatment may, for example, be carried out by contacting the powder or pellets of polymer (F) with a basic compound in a solvent. Specifically, it is preferred to carry out hydrolytic treatment by dispersing the powder or pellets of polymer (F) in a solution of a basic compound by e.g. stirring.

The basic compound may, for example, be sodium hydroxide or potassium hydroxide.

The solvent may, for example, be water or a mixed solvent of water and a polar solvent. The polar solvent may, for example, be an alcohol (such as methanol or ethanol) or dimethylsulfoxide.

The concentration of the basic compound is preferably from 25 to 40 mass % in the solution of the basic compound.

The temperature for the hydrolytic treatment is preferably from 80 to 95° C.

The time for the hydrolytic treatment is preferably from 10 to 20 hours.

(Step (α3))

If the basic compound used in step (α2) will be brought into step (α4), the stabilizer (such as phosphoric acid) for hydrogen peroxide will be neutralized, whereby hydrogen peroxide is likely to be decomposed. Therefore, prior to step (α4), the powder or pellets of the salt-form polymer (H) are sufficiently washed with water. The washing with water of the powder or pellets of the salt-form polymer (H) is preferably carried out until the pH of waste water becomes e.g. at most 8.

The temperature of water at the time of the washing with water is preferably from 80 to 90° C.

(Step (α4))

The powder or pellets of the salt-form polymer (H) are subjected to hydrogen peroxide treatment to decompose impurities (organic substances other than the salt-form polymer (H)) contained in the polymer or pellets of the salt-form polymer (H).

The hydrogen peroxide treatment is carried out, for example, by contacting the powder or pellets of the salt-form polymer (H) with hydrogen peroxide. Hydrogen peroxide may be in the form of an aqueous solution or a gas, and from the viewpoint of the handling efficiency, an aqueous solution is preferred. With a view to carrying out the hydrogen peroxide treatment efficiently, it is preferred to carry out the hydrogen peroxide treatment by dispersing the powder or pellets of the salt-form polymer (H) in an aqueous hydrogen peroxide solution by e.g. stirring.

The concentration of hydrogen peroxide is preferably from 6 to 12 mass % in the aqueous hydrogen peroxide solution.

The temperature for the hydrogen peroxide treatment is preferably from 65 to 85° C.

The time for the hydrogen peroxide treatment is preferably from 10 to 16 hours.

(Step (α5))

Prior to step (α6), the powder or pellets of the hydrogen peroxide-treated salt-form polymer (H) are washed with water.

(Step (α6))

—SO$_3^-$M$^+$ of the salt-form polymer (H) is subjected to acid-form conversion to —SO$_3^-$H$^+$ to obtain an acid-form polymer (H). Here, in the case of the salt-form polymer (H3), —SO$_2$N$^-$(M$^+$)SO$_2$(CF$_2$)$_a$SO$_3^-$M$^+$ is converted to —SO$_2$N$^-$(H$^+$)SO$_2$(CF$_2$)$_2$SO$_3^-$H$^+$.

The acid-form conversion treatment may, for example, be carried out by contacting the powder or pellets of the salt-form polymer (H) with an aqueous solution of an acid (such as sulfuric acid, hydrochloric acid or nitric acid). Specifically, it is preferred to carry out the acid-form conversion treatment by dispersing the powder or pellets of the salt-form polymer (H) in an aqueous solution of an acid by e.g. stirring.

The concentration of the acid in the aqueous solution of an acid is preferably from 2 to 3N.

The temperature for the acid-form conversion treatment is preferably from 80 to 90° C.

The time for the acid-form conversion treatment is preferably from 4 to 7 hours.

(Step (α7))

Prior to step (α8), the powder or pellets of the acid-form polymer (H) are sufficiently washed with water. The washing with water of the powder or pellets of the acid-form polymer (H) is preferably carried out until the pH of the waste water becomes e.g. at least 3.

The powder or pellets of the acid-form polymer (H) washed with water, is recovered by a known method and then dried by a known method.

(Step (α8))

The method for preparing the fluorinated ion exchange resin fluid may be a method of exerting a shearing force to the powder or pellets of the acid-form polymer (H) in a solvent by e.g. stirring to disperse or dissolve the acid-form polymer (H) in the solvent. If required, shearing may be imparted by e.g. supersonic waves.

The preparation temperature is preferably from 0 to 250° C., more preferably from 20 to 150° C.

<Process (β)>

The process (β) may specifically be a process comprising the following steps (β1) to (β10).

(β1) A step of obtaining a powder or pellets of a precursor polymer (hereinafter referred to as polymer (F)) having —$SO_2F$ (precursor groups for cation exchange groups).

(β2) A step of subjecting the powder or pellets of polymer (F) to hydrolytic treatment to convert —$SO_2F$ to —$SO_3^-M^+$ thereby to obtain a powder or pellets of a salt-form polymer (H).

(β3) A step of washing the powder or pellets of the salt-form polymer (H) with water.

(β4) A step of subjecting the powder or pellets of the salt-form polymer (H) to acid-form conversion treatment to convert —$SO_3^-M^+$ to —$SO_3^-H^+$ thereby to obtain a powder or pellets of an acid-form polymer (H).

(β5) A step of washing the powder or pellets of the acid-form polymer (H) with water.

(β6) A step of subjecting the powder or pellets of the acid-form polymer (H) to hydrogen peroxide treatment.

(β7) A step of washing the powder or pellets of the hydrogen peroxide-treated acid-form polymer (H) with water.

(β8) A step of subjecting the powder or pellets of the hydrogen peroxide-treated acid-form polymer (H) again to acid-form conversion treatment to convert —$SO_3^-H^+$ formed by the hydrogen peroxide treatment to —$SO_3^-H^+$ thereby to obtain a powder or pellets of a complete acid-form polymer (H).

(β9) A step of washing the powder or pellets of the again-acid-form conversion-treated acid-form polymer (H) with water, followed by drying.

(β10) A step of mixing the powder or pellets of the acid-form polymer (H) with a solvent to obtain a fluorinated ion exchange resin fluid.

(Step (β1))

Step (β1) is carried out in the same manner as the above step (α1).

(Step (β2))

Step (β2) is carried out in the same manner as the above step (α2).

(Step (β3))

Prior to step (β4), the powder or pellets of the salt-form polymer (H) are sufficiently washed with water.

The washing with water of the powder or pellets of the salt-form polymer (H) is preferably carried out until the pH of the waste water becomes e.g. at most 9.

The temperature of water at the time of the washing with water is preferably from 80 to 90° C.

(Step (β4))

Step (β4) is carried out in the same manner as the above step (α6).

(Step (β5))

Prior to step (β6), the powder or pellets of the acid-form polymer (H) are sufficiently washed with water.

The washing with water of the powder or pellets of the acid-form polymer (H) is preferably carried out until the pH of the waste water becomes e.g. at least 3.

(Step (β6))

Step (β6) is carried out in the same manner as the above step (α4) except that instead of the powder or pellets of the salt-form polymer (H), the powder or pellets of the acid-form polymer (H) are used.

(Step (β7))

Prior to step (β8), the powder or pellets of the hydrogen peroxide-treated acid-form polymer (H) are sufficiently washed with water.

(Step (β8))

In a case where the acid-form polymer (H) is subjected to hydrogen peroxide treatment, part of —$SO_3^-H^+$ of the acid-form polymer (H) is converted to —$SO_3^-M^+$ by metal ions contained in the aqueous hydrogen peroxide solution. Therefore, the powder or pellets of the acid-form polymer (H) treated by the hydrogen peroxide treatment are again subjected to acid-form conversion treatment to convert —$SO_3^-M^+$ formed by the hydrogen peroxide treatment to —$SO_3^-H^+$ thereby to obtain a powder or pellets of a complete acid-form polymer (H).

Step (β8) may be carried out in the same manner as the above step (β4).

(Step (β9))

Prior to step (β10), the powder or pellets of the acid-form polymer (H) are sufficiently washed with water.

The washing with water of the powder or pellets of the acid-form polymer (H) is preferably carried out until the pH of the waste water becomes e.g. at least 5.

The powder or pellets of the acid-form polymer (H) washed with water, are recovered by a known method and then dried by a known method.

(Step (β10))

Step (β10) is carried out in the same manner as the above step (α8).

Another Embodiment

In a case where cation exchange groups of polymer (H) are —$SO_2N(SO_2R^f)^-Z^+$ (wherein $R^f$ is a perfluoroalkyl group which may have an etheric oxygen atom, known imidation treatment may be carried out instead of the hydrolytic treatment.

The imidation treatment may, for example, be carried out by the following methods.

A method of reacting —$SO_2F$ and $R^fSO_2NHM$.

A method of reacting —$SO_2F$ and $R^fSO_2NH_2$ in the presence of an alkali metal hydroxide, an alkali metal carbonate, MF, ammonia or a primary to tertiary amine.

A method of reacting —$SO_2F$ and $R^fSO_2NMSi(CH_3)_3$.

Advantageous Effects

In the above-described process for producing a fluorinated ion exchange resin fluid of the present invention, a powder or pellets of a fluorinated ion exchange resin having cation exchange groups are subjected to hydrogen peroxide treatment, followed by mixing with a solvent, whereby by using the fluid for the after-described process for forming a polymer electrolyte membrane, it is possible to form a polymer electrolyte membrane or a catalyst layer which is excellent in durability and has few wrinkles.

On the other hand, in a conventional process of dipping a polymer electrolyte membrane made of a fluorinated ion exchange resin in an aqueous hydrogen peroxide solution, the polymer electrolyte membrane will be swelled with water, and wrinkles are likely to form in the polymer electrolyte membrane after drying.

Further, by the process (α) of subjecting a powder or pellets of a fluorinated ion exchange resin having salt-form cation exchange groups to hydrogen peroxide treatment and further to acid-form conversion treatment, followed by mixing with a solvent, it is possible to reduce the number of steps from the preparation of a precursor polymer having precursor groups for cation exchange groups to obtaining a fluorinated ion exchange resin fluid containing a fluorinated ion exchange resin having acid-form cation exchange groups.

On the other hand, in the case of the process (β) of subjecting a powder or pellets of a fluorinated ion exchange resin having acid-form cation exchange groups to hydrogen peroxide treatment, followed by mixing with a solvent, it is necessary to carry out each of the acid-form conversion treatment and the accompanying washing with water twice, whereby the number of steps increases from the preparation of a precursor polymer having precursor groups for cation exchange groups, to obtaining a fluorinated ion exchange resin fluid containing a fluorinated ion exchange resin having acid-form cation exchange groups.

<Membrane/Electrode Assembly>

FIG. 1 is a cross-sectional view illustrating one example of a membrane/electrode assembly. The membrane/electrode assembly 10 comprises an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in a state where it is in contact with the catalyst layers 11.

(Catalyst Layer)

The catalyst layer 11 is a layer containing a catalyst and an ion exchange resin. The catalyst layer 11 of the anode 13, and the catalyst layer 11 of the cathode 14 may be the same or different from each other with respect to the components, composition, thickness, etc.

The catalyst may be any catalyst so long as it is one to accelerate the redox reaction in a fuel cell and is preferably a catalyst containing platinum, particularly preferably a supported catalyst having platinum or a platinum alloy supported on a carbon carrier.

The carbon carrier may, for example, be activated carbon or carbon black.

The platinum alloy is preferably an alloy of platinum with at least one metal selected from the group consisting of platinum group metals excluding platinum (ruthenium, rhodium, palladium, osmium and iridium), gold, silver, chromium, iron, titanium, manganese, cobalt, nickel, molybdenum, tungsten, aluminum, silicon, zinc and tin. The supported amount of platinum or a platinum alloy is preferably from 10 to 70 mass % in the supported catalyst (100 mass %).

The amount of platinum contained in the catalyst layer 11 is preferably from 0.01 to 3.0 mg/cm$^2$, from the viewpoint of the optimum thickness to efficiently carry out the electrode reaction, and more preferably from 0.05 to 0.5 mg/cm$^2$ from the viewpoint of the balance between the material cost and the performance.

(Gas Diffusion Layer)

The gas diffusion layer 12 is a layer made of a gas diffusing base material such as carbon paper, carbon cloth or carbon felt.

The surface of the gas diffusion layer 12 is preferably treated for water repellency with a solution or dispersion containing a water-repellent fluoropolymer. By such water repellent treatment, water to be generated in the catalyst layer 11 on the cathode side tends to hardly clog pores in the gas diffusion layer 12, whereby deterioration of the gas diffusion property can be suppressed. It is more preferred that the surface of the gas diffusion layer 12 is treated for water repellency by a dispersion containing a water repellent fluoropolymer and electrically conductive carbon, from the viewpoint of the electrical conductivity of the membrane/electrode assembly 10.

The water-repellent fluoropolymer may, for example, be polytetrafluoroethylene (hereinafter referred to as PTFE). The electrically conductive carbon may, for example, be carbon black.

The water-repellent-treated surface of the gas diffusion layer 12 is in contact with the catalyst layer 11 or the after-described carbon layer 16.

(Polymer Electrolyte Membrane)

The polymer electrolyte membrane 15 is one containing an ion exchange resin and, as the case requires, a reinforcing material. The polymer electrolyte membrane 15 may have a multilayered structure having a plurality of ion exchange resin membranes bonded to one another.

The reinforcing material may be in the form of e.g. a porous body, fibers, woven fabric or non-woven fabric. The reinforcing material is preferably in the form of a porous body from the viewpoint of the strength.

The material of the reinforcing material may, for example, be PTFE, a TFE/hexafluoropropylene copolymer, a TFE/perfluoro(alkyl vinyl ether) copolymer, a TFE/ethylene copolymer (hereinafter referred to as ETFE), polyvinylidene fluoride, polyethylene, polypropylene, polyimide or polyphenylene sulfide. The material for the reinforcing material is preferably a fluorinated material such as PTFE, a TFE/hexafluoropropylene copolymer, a TFE/perfluoro(alkyl vinyl ether) copolymer, ETFE or polyvinylidene fluoride, from the viewpoint of the chemical durability.

The reinforcing material is preferably a porous body made of PTFE from the viewpoint of the strength and chemical durability in the form and material of the reinforcing material.

The porosity of the porous body is preferably from 40 to 98%, particularly preferably from 60 to 95%. If the porosity is low, the resistance of the polymer electrolyte membrane tends to be high. On the other hand, if the porosity is too high, no adequate reinforcing effect can be obtained. The pores of the porous body are preferably composed mainly of pores such that the diameter of the maximum sphere to be in contact with the inside of the pores is at a level of from 1 nm to 2 mm, particularly from 5 nm to 500 μm.

The porous body having the above-mentioned pores may, for example, be obtained by e.g. a stretching method, a fine pore-forming extraction method or a phase transfer method. The stretching method is suitable to obtain a porous body made of PTFE. The fine pore-forming extraction method may be applied to porous bodies of all materials. The phase transfer method is effective to obtain a porous body made of polyvinylidene fluoride or polyimide.

The polymer electrolyte membrane 15 may contain at least one type of atoms selected from the group consisting of cerium and manganese in order to further improve the durability. Cerium and manganese will decompose hydrogen peroxide which is a substance to cause deterioration of the polymer electrolyte membrane 15. Such cerium or manganese is preferably present in the form of ions in the polymer electrolyte membrane 15, and so long as it is present in the form of ions, it may be present in any state in the polymer electrolyte membrane 15.

The polymer electrolyte membrane 15 may contain silica or a hetero polyacid (such as zirconium phosphate, phosphorus molybdic acid or phosphorus tungstic acid) as a water retention agent to prevent drying.

(Carbon Layer)

Figure 2:
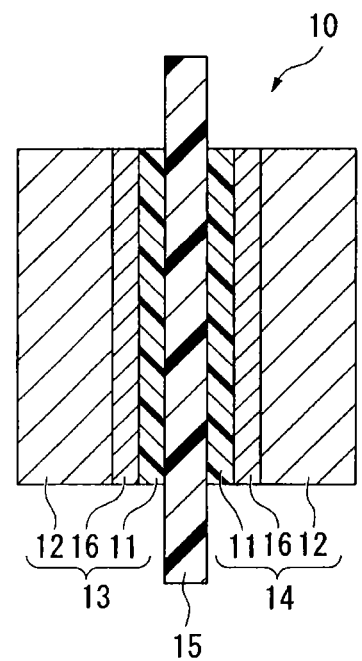
FIG. 2 is a cross-sectional view illustrating another example of a membrane/electrode assembly.

As shown in FIG. 2, the membrane/electrode assembly 10 may have a carbon layer 16 between the catalyst layer 11 and the gas diffusion layer 12. By disposing the carbon layer 16, the gas diffusion properties on the surface of the catalyst layer 11 will be improved, and the power generation performance of a polymer electrolyte fuel cell will be remarkably improved.

The carbon layer 16 is a layer containing carbon (such as carbon powder or carbon nano fibers) and a fluoropolymer. The carbon is preferably carbon nano fibers having a fiber diameter of from 1 to 1,000 nm and a fiber length of at most 1,000 μm.

The fluoropolymer may, for example, be PTFE.

(Subgaskets)

The membrane/electrode assembly of the present invention may have two frame-shaped subgaskets (not shown) disposed to sandwich the polymer electrolyte membrane 15 around the membrane/electrode assembly 10.

Other Embodiments

Further, the membrane/electrode assembly obtainable by the process of the present invention is not limited to the membrane/electrode assembly 10 illustrated in the drawings.

<Processes for Producing Membrane/Electrode Assembly>

The membrane/electrode assembly 10 may, for example, be produced by the following processes.

(a-1) A process of forming a catalyst layer 11 on a carrier film, then transferring such a catalyst layer 11 on each side of a polymer electrolyte membrane 15 to form a membrane/catalyst layer assembly, and sandwiching such a membrane/catalyst layer assembly by gas diffusion layers 12.

(a-2) A process of forming a catalyst layer 11 on each side of a polymer electrolyte membrane 15 to obtain a membrane/catalyst layer assembly, and sandwiching such a membrane/catalyst layer assembly by gas diffusion layers 12.

(a-3) A process of forming a catalyst layer 11 on a gas diffusion layer 12 to obtain electrodes (anode 13 and cathode 14), and sandwiching a polymer electrolyte membrane 15 by the electrodes.

(a-4) A process of forming a catalyst layer 11, a polymer electrolyte membrane 15 and a catalyst layer 11 sequentially on a carrier film to obtain a membrane/catalyst layer assembly, and sandwiching such a membrane/catalyst layer assembly by gas diffusion layers 12.

In a case where the membrane/electrode assembly 10 has carbon layers 16, the membrane/electrode assembly 10 may, for example, be produced by the following processes.

(b-1) A process of applying a dispersion containing carbon and a fluoropolymer on a gas diffusion layer 12, followed by drying to form a carbon layer 16, and sandwiching the membrane/catalyst layer assembly in the process (a-1) or (a-2) by such gas diffusion layers 12 each having the carbon layer 16.

(b-2) A process of applying a dispersion containing carbon and a fluoropolymer on the surface of a carrier film, followed by drying to form a carbon layer 16, then forming a catalyst layer 11 on the carbon layer 16, bonding the catalyst layer 11 and a polymer electrolyte membrane 15, removing the carrier film to obtain a membrane/catalyst layer assembly having carbon layers 16, and sandwiching the membrane/catalyst layer assembly by gas diffusion layers 12.

(Process for Forming Polymer Electrolyte Membrane)

An ion exchange resin fluid is applied on an object to be coated (a carrier film or a catalyst layer 11), followed by drying to form a polymer electrolyte membrane 15.

The ion exchange resin fluid may be a fluorinated ion exchange resin fluid obtained by the process of the present invention, or may be a known ion exchange resin fluid. However, the fluorinated ion exchange resin fluid obtained by the process of the present invention is preferred in that it is thereby possible to form a polymer electrolyte membrane 15 excellent in durability.

In order to stabilize the polymer electrolyte membrane 15, it is preferred to carry out heat treatment. The temperature for the heat treatment is preferably from 130 to 200° C., although it may depends also on the type of the ion exchange resin. When the temperature for the heat treatment is at least 130° C., the ion exchange resin will not excessively contain water. When the temperature for the heat treatment is at most 200° C., heat decomposition of the cation exchange groups can be suppressed, and a decrease in the proton conductivity of the polymer electrode membrane 15 can be suppressed.

(Process for Forming Catalyst Layer)

A paste for forming a catalyst layer is applied on an object to be coated (a carrier film, a polymer electrolyte membrane 15, a gas diffusion layer 12 or a carbon layer 16), followed by drying to form a catalyst layer 11.

A paste for forming a catalyst layer is a liquid having an ion exchange resin and a catalyst dispersed in a dispersing medium. The paste for forming a catalyst layer may be prepared, for example, by mixing an ion exchange resin fluid with a catalyst or a dispersion of a catalyst.

The paste for forming a catalyst layer may be a paste for forming a catalyst layer obtained by the process of the present invention, or a conventional paste for forming a catalyst layer. However, a paste for forming a catalyst layer obtained by the process of the present invention is preferred in that it is thereby possible to form a catalyst layer 11 excellent in durability.

(Carrier Film)

The carrier film may, for example, be an ETFE film or an olefin-type resin film.

Advantageous Effects

In the process for forming a polymer electrolyte membrane of the present invention as described above, a fluorinated ion exchange resin fluid obtained by the process of the present invention is applied on a carrier film or a catalyst layer, followed by drying to form a polymer electrolyte membrane, whereby it is possible to form a polymer electrolyte membrane which is excellent in durability and has few wrinkles.

Further, according to the process for producing a paste for forming a catalyst layer of the present invention as described above, a fluorinated ion exchange resin fluid obtained by the process of the present invention is mixed with a catalyst or a dispersion of a catalyst, whereby by using the process for forming a catalyst layer of the present invention, it is possible to form a catalyst layer which is excellent in durability and has few wrinkles.

Further, according to the process for forming a catalyst layer of the present invention as described above, a paste for forming a catalyst layer obtained by the process of the present invention is applied on a carrier film, a polymer electrolyte membrane or a gas diffusion layer, followed by drying to form a catalyst layer, whereby it is possible to form a catalyst layer which is excellent in durability and has few wrinkles.

Further, in the process for producing a membrane/electrode assembly for a polymer electrolyte fuel cell of the present invention as described above, a polymer electrolyte membrane is formed by the process for forming a polymer electrolyte membrane of the present invention, or a catalyst layer is formed by the process for forming a catalyst layer of the present invention, whereby it is possible to produce a membrane/electrode assembly for a polymer electrolyte fuel cell, which is excellent in durability and power generation properties.

<Polymer Electrolyte Fuel Cell>

On each side of the membrane/electrode assembly obtained by the process of the present invention, a separator having grooves formed to constitute gas flow path, is disposed to obtain a polymer electrolyte fuel cell.

The separator may be a separator made of various electrical conductive materials, such as a separator made of metal, a separator made of carbon, or a separator made of a material having graphite and a resin mixed.

In the polymer electrolyte fuel cell, power generation is carried out by supplying a gas containing oxygen to the cathode and supplying a gas containing hydrogen to the anode. Further, the membrane/electrode assembly can be applied also to a methanol fuel cell whereby power generation is carried out by supplying methanol to the anode.

EXAMPLES

Now, the present invention will be described in detail with reference to Examples. However, it should be understood that the present invention is by no means restricted to such specific Examples.

Examples 1 to 3 are Examples of the present invention, and Examples 4 to 6 are Comparative Examples.

(Cell Voltage at Initial Stage of Operation)

A membrane/electrode assembly was assembled into a cell for power generation, and hydrogen (utilization ratio: 70%) and air (utilization ratio: 40%) were, respectively, supplied to an anode and a cathode under normal pressure, and at a cell temperature of 80° C., the cell voltages at the initial stage of operation were measured at current densities of 0.2 A/cm$^2$, 1.0 A/cm$^2$ and 1.5 A/cm$^2$. Here, the gas dew point of the anode was 80° C., and the gas dew point of the cathode was 80° C.

(Durability)

A membrane/electrode assembly was assembled into a cell for power generation, and as an accelerated test, the following open-circuit test (OCV test) was carried out.

Hydrogen (utilization ratio: 50%) and air (utilization ratio: 50%) corresponding to a current density of 0.2 A/cm$^2$, were, respectively, applied to the anode and the cathode under normal pressure. The operation was carried out in an open-circuit state without carrying out power generation, at a cell temperature of 120° C., a gas dew point of the anode being 73° C., and a gas dew point of the cathode being 73° C. A gas discharged at that time was bubbled for 24 hours in a 0.1 mol./L potassium hydroxide aqueous solution to capture discharged fluoride ions. And, the concentration of the fluoride ions was quantified by ion chromatograph, and the discharge rate of the fluoride ions was calculated.

Evaluation of the durability was carried out based on the discharge rate of the fluoride ions upon expiration of 200 hours from the initiation of the open-circuit test.

(Preparation of Gas Diffusion Layer)

As a gas diffusion layer, carbon paper (H2315T10ACX96, manufactured by NOK Company) was prepared. On the carbon paper, a dispersion containing carbon and a fluoropolymer, was applied and dried to form a carbon layer.

(Preparation of Gasket)

A polyethylene naphthalate film having a thickness of 25 µm was cut into 120 mm (short side)×150 mm (long side) and at its center, a rectangular opening of 50 mm square or 51 mm square was formed to obtain a frame-shaped gasket.

Example 1

Preparation of Fluorinated Ion Exchange Resin Fluid

Step (β1):

Polymer (F1-1) (copolymer of TFE and monomer (m1-1), ion exchange capacity after hydrolysis: 1.1 meq/g dry resin) was put into an extruder and extruded from a die having a hole of 4 mm in diameter and heated to 200° C. and pulled at a rate slightly higher than the extrusion rate and cooled, followed by cutting by a pelletizer to obtain pellets of polymer (F1-1) having a cross-sectional diameter of from 1 to 3 mm and a length of from 5 to 20 mm.

Step (β2):

450 g of the pellets of polymer (F1-1) were put into a reactor made of glass and having an internal capacity of 2.5 L, and 0.68 kg of an aqueous potassium hydroxide solution having a concentration of 48 mass %, 0.44 kg of methanol and 1.0 kg of ultrapure water were put, and the temperature was raised with stirring until the internal temperature became 90° C., and while controlling the temperature to be ±3° C., the system was maintained for 16 hours. Thereafter, the liquid containing potassium hydroxide was discharged to obtain pellets of salt-form polymer (H1-1).

Step (β3):

Into the reactor, 2.0 kg of ultrapure water was put, the temperature was raised to 85° C., and stirring were carried out for one hour, and then, the temperature was lowered, and water was discharged. Such an operation was repeated five times in total. The pH of the water discharged the 5th time was confirmed to be 9.

Step (β4):

Into the reactor, 2.0 kg of 3N sulfuric acid was put, the temperature was raised to 85° C. and stirring was carried out for 3 hours, and then, water was discharged to obtain pellets of acid-form polymer (H1-1).

Step (β5):

Into the reactor, 2.0 kg of ultrapure water was put, the temperature was raised to 90° C., and stirring were carried out for one hour, and then, water was discharged. Such an operation was repeated five times in total. The pH of the water discharged the 5th time was confirmed to be at least 4.

Step (β6):

Into the reactor, 2.0 kg of an aqueous hydrogen peroxide solution having a concentration of 8 mass % was put, the temperature was raised with stirring until the internal temperature became 80° C., and while controlling the temperature to be ±3° C., the system was maintained for 16 hours.

Thereafter, the aqueous hydrogen peroxide solution was discharged to obtain pellets of hydrogen peroxide-treated acid-form polymer (H1-1).

Step (β7):

Into the reactor, 2.0 kg of ultrapure water was put, the temperature was raised to 85° C., and stirring was carried out for two hours, and then, water was discharged.

Step (β8):

Into the reactor, 2.0 kg of 3N sulfuric acid was put, the temperature was raised to 85° C., and stirring was carried out for two hours, and then, water was discharged.

Step (β9):

Into the reactor, 2.0 kg of ultrapure water was put, the temperature was raised to 90° C., and stirring was carried out for one hour, and then, water was discharged. Such an operation was repeated ten times in total. The pH of the water discharged the 10th time was confirmed to be at least 6. Drying was carried out while introducing nitrogen gas into the reactor, to obtain 440 g of pellets of acid-form polymer (H1-1).

Step (β10):

440 g of pellets of acid-form polymer (H1-1) in step (β9) in Example 1 were put into a container made of hastelloy, and 0.4 kg of ultrapure water was put, followed by stirring. While stirring, 0.68 kg of ethanol was put. The temperature was raised so that the internal temperature became 105° C., and stirring was carried out for 4 hours at 105° C., followed by cooling.

After the cooling, filtration was carried out by means of a 10 μm filter to obtain a fluorinated ion exchange resin fluid (L-1) having a solid content concentration of 28 mass %.

(Formation of Polymer Electrolyte Membrane)

On an ETFE film having a thickness of 100 μm, the fluorinated ion exchange resin fluid (L-1) was applied by means of a slit die so that the film thickness after drying would be 17 μm and dried at 80° C. for 15 minutes, followed by heat treatment at 150° C. for 30 minutes to obtain a polymer electrolyte membrane (M-1). No wrinkles were observed on the polymer electrolyte membrane (M-1).

(Production of Paste for Catalyst Layer)

33 g of a catalyst (manufactured by Tanaka Kikinzoku K.K.) having a platinum catalyst supported on a carbon carrier (specific surface area: 500 m$^2$/g) so that it was contained in an amount of 50 mass % in the total mass of the catalyst, was added to 227.5 g of distilled water and pulverized by means of an ultrasonic wave-applying apparatus, and further, 117.5 g of ethanol was added, followed by stirring well. 122.5 g of a dispersion having the fluorinated ion exchange resin fluid (L-1) dispersed in ethanol and having a solid content concentration of 10 mass %, was added thereto, followed by stirring well to obtain a paste (P-1) for forming a catalyst layer.

(Formation of Catalyst Layer)

On an ETFE film, the paste (P-1) for forming a catalyst layer was applied by means of a die coater so that the amount of platinum would be 0.4 mg/cm$^2$ and dried at 80° C. for 15 minutes in a dryer, followed by heat treatment at 150° C. for 15 minutes to obtain a catalyst layer-attached film (C-1) for an anode and a cathode. No wrinkles were observed on the catalyst layer.

(Production of Membrane/Electrode Assembly)

On a PTFE sheet having a thickness of 100 μm, the catalyst layer-attached film (C-1) was disposed so that the side on which the catalyst layer was formed, faced above. A gasket was disposed thereon, so that the catalyst layer was seen through the rectangular opening. The polymer electrolyte membrane (M-1) was disposed thereon. A gasket was disposed thereon. The catalyst layer-attached film (C-1) was disposed thereon so that the side on which the catalyst layer was formed, faced downward. They were put in a press machine preliminarily heated to 130° C. and pressed at 3.0 MPa for 3 minutes. After cooling to at most 50° C., the assembly was taken out, and the ETFE film was peeled off to obtain a membrane/catalyst assembly having an electrode area of 25 cm$^2$.

On a PTFE sheet having a thickness of 100 μm, the carbon layer-attached gas diffusion layer larger by 2 mm than the opening of the gasket was disposed so that the carbon layer faced upward. The membrane/catalyst layer assembly was disposed thereon. A carbon layer-attached gas diffusion layer larger by 2 mm than the opening of the gasket was disposed thereon so that the carbon layer faced downward. A PTFE sheet having a thickness of 100 μm was disposed thereon. They were put in a pressing machine preliminarily heated to 150° C. and pressed at 1.5 MPa for one minute. After cooling to at most 50° C., the assembly was taken out to obtain a membrane/electrode assembly.

Measurement of the cell voltage at the initial stage of operation and evaluation of the durability were carried out. The results are shown in Tables 1 and 2.

Example 2

Production of Fluorinated Ion Exchange Resin Fluid

Step (α1):

Pellets of polymer (F1-1) having a cross-sectional diameter of from 1 to 3 mm and a length of from 5 to 20 mm, obtained in step (β1) in Example 1, were prepared.

Step (α2):

Pellets of salt-form polymer (H1-1) were obtained by carrying out hydrolytic treatment in the same manner as step (β2) in Example 1.

Step (α3):

Into the reactor, 2.0 kg of ultrapure water was put, the temperature was raised to 85° C., and stirring was carried out for one hour, and then, the temperature was lowered, and water was discharged. Such an operation was repeated ten times in total. The pH of the water discharged the 10th time was confirmed to be 8.

Step (α4):

Pellets of hydrogen peroxide-treated salt-form polymer (H1-1) were obtained by carrying out hydrogen peroxide treatment in the same manner as step (β6) in Example 1.

Step (α5):

Washing with water was carried out in the same manner as step (β7) in Example 1.

Step (α6):

Pellets of acid-form polymer (H1-1) were obtained by carrying out acid-form conversion treatment in the same manner as step (β4) in Example 1.

Step (α7):

Into the reactor, 2.0 kg of ultrapure water was put, the temperature was raised to 85° C., and stirring was carried out for one hour, and then, water was discharged. Such an operation was repeated ten times in total. The pH of the water discharged the 10th time was confirmed to be 6. Drying was carried out while introducing nitrogen gas into the reactor, to obtain 440 g of pellets of acid-form polymer (H1-1).

Step (α8):

A fluorinated ion exchange resin fluid (L-2) having a solid content concentration of 28 mass %, was obtained in the same manner as step (β10) in Example 1 except that instead of the pellets of acid-form polymer (H1-1) in step (β9) in Example 1, the pellets of acid-form polymer (H1-1) in step (α7) in Example 2 were used.
(Formation of Polymer Electrolyte Membrane)

A polymer electrolyte membrane (M-2) was obtained in the same manner as in Example 1 except that instead of the fluorinated ion exchange resin fluid (L-1), the fluorinated ion exchange resin fluid (L-2) was used. No wrinkles were observed on the polymer electrolyte membrane (M-2).
(Production of Paste for Forming Catalyst Layer)

A paste (P-2) for forming a catalyst layer was obtained in the same manner as in Example 1 except that instead of the fluorinated ion exchange resin fluid (L-1), the fluorinated ion exchange resin fluid (L-2) was used.
(Formation of Catalyst Layer)

A catalyst layer-attached film (C-2) for an anode and a cathode, was obtained in the same manner as in Example 1 except that instead of the paste (P-1) for forming a catalyst layer, the paste (P-2) for forming a catalyst layer was used. No wrinkles were observed on the catalyst layer.
(Production of Membrane/Electrode Assembly)

A membrane/electrode assembly was obtained in the same manner as in Example 1 except that instead of the polymer electrolyte membrane (M-1), the polymer electrolyte membrane (M-2) was used, and instead of the catalyst layer-attached film (C-1), the catalyst layer-attached film (C-2) was used.

Measurement of the cell voltage at the initial stage of operation and evaluation of the durability were carried out. The results are shown in Tables 1 and 2.

Example 3

Production of Fluorinated Ion Exchange Resin Fluid

Step (α1):
Pellets of polymer (F1-1) having a cross-sectional diameter of from 1 to 3 mm and a length of from 5 to 20 mm, obtained in step (β1) in Example 1, were prepared.

The pellets of polymer (F1-1) were put into a pulverizer (manufactured by HORAI Co, Ltd.) and pulverized to a level of from 0.5 to 2 mm to obtain a powder of polymer (F1-1).
Steps (α2) to (α8):

A fluorinated ion exchange resin fluid (L-3) having a solid content concentration of 28 mass %, was obtained in the same manner as steps (α2) to (α8) in Example 2 except that instead of the pellets of polymer (F1-1), the powder of polymer (F1-1) was used.
(Formation of Polymer Electrolyte Membrane)

A polymer electrolyte membrane (M-3) was obtained in the same manner as in Example 1 except that instead of the fluorinated ion exchange resin fluid (L-1), the fluorinated ion exchange resin fluid (L-3) was used. No wrinkles were observed on the polymer electrolyte membrane (M-3).
(Production of Paste for Forming Catalyst Layer)

A paste (P-3) for forming a catalyst layer was obtained in the same manner as in Example 1 except that instead of the fluorinated ion exchange resin fluid (L-1), the fluorinated ion exchange resin fluid (L-3) was used.
(Formation of Catalyst Layer)

A catalyst layer-attached film (C-3) for an anode and a cathode, was obtained in the same manner as in Example 1 except that instead of the paste (P-1) for forming a catalyst layer, the paste (P-3) for forming a catalyst layer was used. No wrinkles were observed on the catalyst layer.
(Production of Membrane/Electrode Assembly)

A membrane/electrode assembly was obtained in the same manner as in Example 1 except that instead of the polymer electrolyte membrane (M-1), the polymer electrolyte membrane (M-3) was used, and instead of the catalyst layer-attached film (C-1), the catalyst layer-attached film (C-3) was used.

Measurement of the cell voltage at the initial stage of operation was carried out. The results are shown in Table 1.

Example 4

Production of Fluorinated Ion Exchange Resin Fluid

Step (γ1):
Pellets of polymer (F1-1) having a cross-sectional diameter of from 1 to 3 mm and a length of from 5 to 20 mm, obtained in step (β1) in Example 1, were prepared.

The pellets of polymer (F1-1) were put into a reactor made of nickel, and a 10 vol % fluorine gas and a 90 vol % nitrogen gas were introduced, and the temperature was raised to 190° C. to fluorinate —C(O)OH terminals derived from a radical initiator. The pellets of the fluorination-treated polymer (F1-1) were put into an extruder and extruded from a die having a hole of 4 mm in diameter and heated to 200° C., pulled at a rate slightly higher than the extrusion rate and cooled, followed by cutting by a pelletizer to obtain pellets of a fluorination-treated polymer (F1-1) having a cross-sectional diameter of from 1 to 3 mm and a length of from 5 to 20 mm.
Step (γ2):
Pellets of salt-form polymer (H1-1) were obtained by carrying out hydrolytic treatment in the same manner as step (β2) in Example 1.
Step (γ3):
Washing with water was carried out in the same manner as step (β3) in Example 1. The pH of the water discharged the 5th time was confirmed to be 9.
Step (γ4):
Pellets of acid-form polymer (H1-1) were obtained by carrying out acid-form conversion treatment in the same manner as step (β4) in Example 1.
Step (γ5):
Washing with water was carried out in the same manner as step (β5) in Example 1. The pH of the water discharged was confirmed to be at least 4. Drying was carried out while introducing nitrogen gas into the reactor, to obtain 440 g of pellets of acid-form polymer (H1-1).
Step (γ6):
A fluorinated ion exchange resin fluid (L-4) having a solid content concentration of 28 mass %, was obtained in the same manner as step (β10) in Example 1 except that instead of the pellets of acid-form polymer (H1-1) in step (β9) in Example 1, the pellets of acid-form polymer (H1-1) in step (γ5) in Example 4 were used.
(Formation of Polymer Electrolyte Membrane)

A polymer electrolyte membrane (M-4) was obtained in the same manner as in Example 1 except that instead of the fluorinated ion exchange resin fluid (L-1), the fluorinated ion exchange resin fluid (L-4) was used. No wrinkles were observed on the polymer electrolyte membrane (M-4).
(Production of Paste for Forming Catalyst Layer)

A paste (P-4) for forming a catalyst layer was obtained in the same manner as in Example 1 except that instead of the fluorinated ion exchange resin fluid (L-1), the fluorinated ion exchange resin fluid (L-4) was used.
(Formation of Catalyst Layer)

A catalyst layer-attached film (C-4) for an anode and a cathode, was obtained in the same manner as in Example 1 except that instead of the paste (P-1) for forming a catalyst layer, the paste (P-4) for forming a catalyst layer was used. No wrinkles were observed on the catalyst layer.
(Production of Membrane/Electrode Assembly)

A membrane/electrode assembly was obtained in the same manner as in Example 1 except that instead of the polymer electrolyte membrane (M-1), the polymer electrolyte membrane (M-4) was used, and instead of the catalyst layer-attached film (C-1), the catalyst layer-attached film (C-4) was used.

Measurement of the cell voltage at the initial stage of operation and evaluation of durability were carried out. The results are shown in Tables 1 and 2.

Example 5

Production of Fluorinated Ion Exchange Resin Fluid

Step (γ1):

Pellets of polymer (F1-1) having a cross-sectional diameter of from 1 to 3 mm and a length of from 5 to 20 mm, obtained in step (β1) in Example 1, were prepared.
Steps (γ2) to (γ6):

A fluorinated ion exchange resin fluid (L-5) having a solid content concentration of 28 mass %, was obtained in the same manner as steps (γ2) to (γ6) in Example 4 except that instead of the pellets of fluorination-treated polymer (F1-1), pellets of polymer (F1-1) not treated by such fluorination treatment, were used.
(Formation of Polymer Electrolyte Membrane)

A polymer electrolyte membrane (M-5) was obtained in the same manner as in Example 1 except that instead of the fluorinated ion exchange resin fluid (L-1), the fluorinated ion exchange resin fluid (L-5) was used. No wrinkles were observed on the polymer electrolyte membrane (M-5).
(Production of Paste for Forming Catalyst Layer)

A paste (P-5) for forming a catalyst layer was obtained in the same manner as in Example 1 except that instead of the fluorinated ion exchange resin fluid (L-1), the fluorinated ion exchange resin fluid (L-5) was used.
(Formation of Catalyst Layer)

A catalyst layer-attached film (C-5) for an anode and a cathode, was obtained in the same manner as in Example 1 except that instead of the paste (P-1) for forming a catalyst layer, the paste (P-5) for forming a catalyst layer was used. No wrinkles were observed on the catalyst layer.
(Production of Membrane/Electrode Assembly)

A membrane/electrode assembly was obtained in the same manner as in Example 1 except that instead of the polymer electrolyte membrane (M-1), the polymer electrolyte membrane (M-5) was used, and instead of the catalyst layer-attached film (C-1), the catalyst layer-attached film (C-5) was used.

Evaluation of durability was carried out. The results are shown in Table 2.

Example 6

A commercially available polymer electrolyte membrane (Nafion NR211, manufactured by DuPont) was peeled off from a substrate and immersed in an aqueous hydrogen peroxide solution having a concentration of 8 mass %, and put together with the container in an oven at 80° C. and heated for 16 hours. Then, the polymer electrolyte membrane was taken out, washed with water and dried in air. The film after drying in air had many wrinkles, and in the same manner as in Example 1, membrane/electrode assembly was produced, but leakage was substantial, and no evaluation was possible.

TABLE 1

| | Cell voltage at the initial stage of operation [V] | | |
|---|---|---|---|
| | 0.1 A/cm$^2$ | 1.0 A/cm$^2$ | 1.5 A/cm$^2$ |
| Ex. 1 | 0.798 | 0.658 | 0.589 |
| Ex. 2 | 0.801 | 0.658 | 0.591 |
| Ex. 3 | 0.800 | 0.657 | 0.590 |
| Ex. 4 | 0.797 | 0.642 | 0.574 |
| Ex. 6 | — | — | — |

TABLE 2

| Durability | Ex. 2 | Ex. 3 | Ex. 4 | Ex. 5 |
|---|---|---|---|---|
| Discharge rate of fluoride ions [μg/day · cm$^2$] | 0.4 | 0.4 | 0.5 | 54 |

INDUSTRIAL APPLICABILITY

The membrane/electrode assembly obtained by the process of the present invention is useful as a membrane/electrode assembly for a polymer electrolyte fuel cell which is required to be operated constantly for a long period of time.

The entire disclosures of Japanese Patent Application No. 2012-019005 filed on Jan. 31, 2012 and U.S. Provisional Patent Application No. 61/622,180 filed on Apr. 10, 2012 including specifications, claims, drawings and summaries are incorporated herein by reference in their entireties.

REFERENCE SYMBOLS

10: Membrane/electrode assembly
11: Catalyst layer
12: Gas diffusion layer
13: Anode
14: Cathode
15: Polymer electrolyte membrane
16: Carbon layer

What is claimed is:

1. A process for producing a fluorinated ion exchange resin fluid, comprising:
   subjecting pellets of a fluorinated ion exchange resin having cation exchange groups to hydrogen peroxide treatment, the pellets having a cross-sectional diameter of at most 3 mm and a length of at most 20 mm; and
   mixing the treated pellets with a solvent to obtain a fluorinated ion exchange resin fluid;
   wherein the process is performed without carrying out a fluorination reaction.

2. The process for producing a fluorinated ion exchange resin fluid according to claim 1, wherein the cation exchange groups are salt-form cation exchange groups.

3. The process for producing a fluorinated ion exchange resin fluid according to claim 1, wherein the cation exchange groups are acid-form cation exchange groups.

4. The process for producing a fluorinated ion exchange resin fluid according to claim 2, wherein the pellets are subjected to hydrogen peroxide treatment and further to acid-form conversion treatment, and then mixed with the solvent.

5. The process for producing a fluorinated ion exchange resin fluid according to claim 1, wherein the fluorinated ion exchange resin is a perfluorocarbon polymer having cation exchange groups.

6. The process for producing a fluorinated ion exchange resin fluid according to claim 1, wherein the hydrogen peroxide treatment is carried out by dispersing the pellets in an aqueous hydrogen peroxide solution.

7. A process for forming a polymer electrolyte membrane, which comprises applying a fluorinated ion exchange resin fluid obtained by the process as defined in claim 1, on an object to be coated, followed by drying to form a polymer electrolyte membrane.

8. A process for producing a membrane/electrode assembly for a polymer electrolyte fuel cell comprising:
   an anode having a catalyst layer,
   a cathode having a catalyst layer, and
   a polymer electrolyte membrane disposed between the anode and the cathode,
   which comprises forming the polymer electrolyte membrane by the process for forming a polymer electrolyte membrane as defined in claim 7.

* * * * *